(12) United States Patent
Yokota et al.

(10) Patent No.: US 10,382,351 B2
(45) Date of Patent: Aug. 13, 2019

(54) SERVICE PROVISIONING AND APPLICATION DISTRIBUTION BASED ON TERMINAL LOCATION

(71) Applicant: FUJITSU LIMITED, Kawasaki-shi, Kanagawa (JP)

(72) Inventors: Koichi Yokota, Yokohama (JP); Naoki Nishiguchi, Kawasaki (JP); Akira Fujii, Machida (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 324 days.

(21) Appl. No.: 15/217,733

(22) Filed: Jul. 22, 2016

(65) Prior Publication Data

US 2017/0054794 A1    Feb. 23, 2017

(30) Foreign Application Priority Data

Aug. 19, 2015  (JP) ................. 2015-162009

(51) Int. Cl.
| | |
|---|---|
| G06F 15/16 | (2006.01) |
| H04L 12/911 | (2013.01) |
| H04L 29/08 | (2006.01) |
| G09B 5/12 | (2006.01) |
| H04L 12/835 | (2013.01) |

(52) U.S. Cl.
CPC ............. H04L 47/70 (2013.01); G09B 5/12 (2013.01); H04L 47/30 (2013.01); H04L 47/822 (2013.01); H04L 67/1095 (2013.01); H04L 67/34 (2013.01)

(58) Field of Classification Search
CPC ....... H04L 47/70; H04L 47/30; H04L 47/822; H04L 67/34; H04L 67/1095; G09B 5/12

USPC .................................. 709/202–205, 225–229
See application file for complete search history.

(56) References Cited

U.S. PATENT DOCUMENTS

| | | | | |
|---|---|---|---|---|
| 6,976,087 | B1 * | 12/2005 | Westfall ................ | H04L 47/822 709/203 |
| 7,225,261 | B2 * | 5/2007 | Nishiguchi ........... | H04L 69/329 709/227 |
| 7,797,424 | B2 * | 9/2010 | Ogawa .............. | H04L 29/12216 709/226 |

(Continued)

FOREIGN PATENT DOCUMENTS

| | | |
|---|---|---|
| JP | 2000-207216 | 7/2000 |
| JP | 2006-12076 | 1/2006 |

(Continued)

*Primary Examiner* — Bharat Barot
(74) *Attorney, Agent, or Firm* — Fujitsu Patent Center

(57) ABSTRACT

A service provision method executed by a system including a terminal configured to use a service and a service provision apparatus configured to provide the service, the service providing method includes collecting resource information of an output device coupled to the service provision apparatus when the terminal checks in to the service provision apparatus, providing a first application to the terminal and a second application to the output device from the service provision apparatus when the output device is usable in accordance with the resource information, and providing a third application to the terminal from the service provision apparatus, the third application generated on the basis of the first application and the second application, when the output device is unusable in accordance with the resource information.

7 Claims, 20 Drawing Sheets

(56) References Cited

U.S. PATENT DOCUMENTS

| | | | | |
|---|---|---|---|---|
| 8,549,147 | B2* | 10/2013 | Akiyama | G06F 9/5055 |
| | | | | 709/205 |
| 2001/0027484 | A1* | 10/2001 | Nishi | H04L 47/70 |
| | | | | 709/223 |
| 2002/0133805 | A1* | 9/2002 | Pugh | G06F 8/71 |
| | | | | 717/120 |
| 2003/0046411 | A1* | 3/2003 | Nishiguchi | H04L 69/329 |
| | | | | 709/229 |
| 2004/0230681 | A1* | 11/2004 | Strassner | H04L 67/30 |
| | | | | 709/226 |
| 2012/0226739 | A1* | 9/2012 | Kim | H04L 67/2809 |
| | | | | 709/203 |
| 2015/0017964 | A1 | 1/2015 | Cha | |

FOREIGN PATENT DOCUMENTS

| | | |
|---|---|---|
| JP | 2014-10537 | 1/2014 |
| JP | 2014-191686 | 10/2014 |
| JP | 2015-18537 | 1/2015 |

* cited by examiner

FIG. 4A

Resource Information (Electronic Whiteboard Device) — 410

| Device ID | Output Function (Display/Voice) | Controller Type |
|---|---|---|
| A001 | DISPLAY | WhiteBoard |

FIG. 4B

Resource Information (Terminal Device) — 421

| Device ID | Output Function (Display/Voice) | Controller Type |
|---|---|---|
| B001 | DISPLAY | EducationApp |
| B001 | DISPLAY | WhiteBoard |
| B001 | VOICE | Speaker |

Resource Information (Terminal Device) — 422

| Device ID | Output Function (Display/Voice) | Controller Type |
|---|---|---|
| B002 | DISPLAY | EducationApp |
| B002 | DISPLAY | WhiteBoard |
| B002 | VOICE | Speaker |

Resource Information (Terminal Device) — 423

| Device ID | Output Function (Display/Voice) | Controller Type |
|---|---|---|
| B003 | DISPLAY | EducationApp |
| B003 | DISPLAY | WhiteBoard |
| B003 | VOICE | Speaker |

FIG. 4C

Resource Information (Voice Output Device) — 430

| Device ID | Output Function (Display/Voice) | Controller Type |
|---|---|---|
| C001 | VOICE | Speaker |

FIG. 5

| RESOURCE MANAGEMENT INFORMATION ||||| 500 |
| DEVICE ID | OUTPUT FUNCTION (DISPLAY/VOICE) | OUTPUT OBJECT | CONTROLLER TYPE | CONTROLLER OBJECT |
|---|---|---|---|---|
| A001 | DISPLAY | Di_A_001 | WhiteBoard | Wb001 |
| B001 | DISPLAY | Di_B_001 | EducationApp | Ed001 |
|  |  |  | WhiteBoard | – |
|  | VOICE | – | Speaker | – |
| B002 | DISPLAY | Di_B_002 | EducationApp | Ed002 |
|  |  |  | WhiteBoard | – |
|  | VOICE | – | Speaker | – |
| B003 | DISPLAY | Di_B_003 | EducationApp | Ed003 |
|  |  |  | WhiteBoard | – |
|  | VOICE | – | Speaker | – |
| C001 | VOICE | Au_C_001 | Speaker | Sp001 |

FIG. 6

| RESOURCE MANAGEMENT INFORMATION | | | | |
|---|---|---|---|---|
| DEVICE ID | OUTPUT FUNCTION (DISPLAY/VOICE) | OUTPUT OBJECT | CONTROLLER TYPE | CONTROLLER OBJECT |
| B001 | DISPLAY | Di_B_004 | EducationApp | Ed004 |
| | | Di_B_005 | WhiteBoard | Wb002 |
| | VOICE | Au_B_002 | Speaker | Sp002 |

600

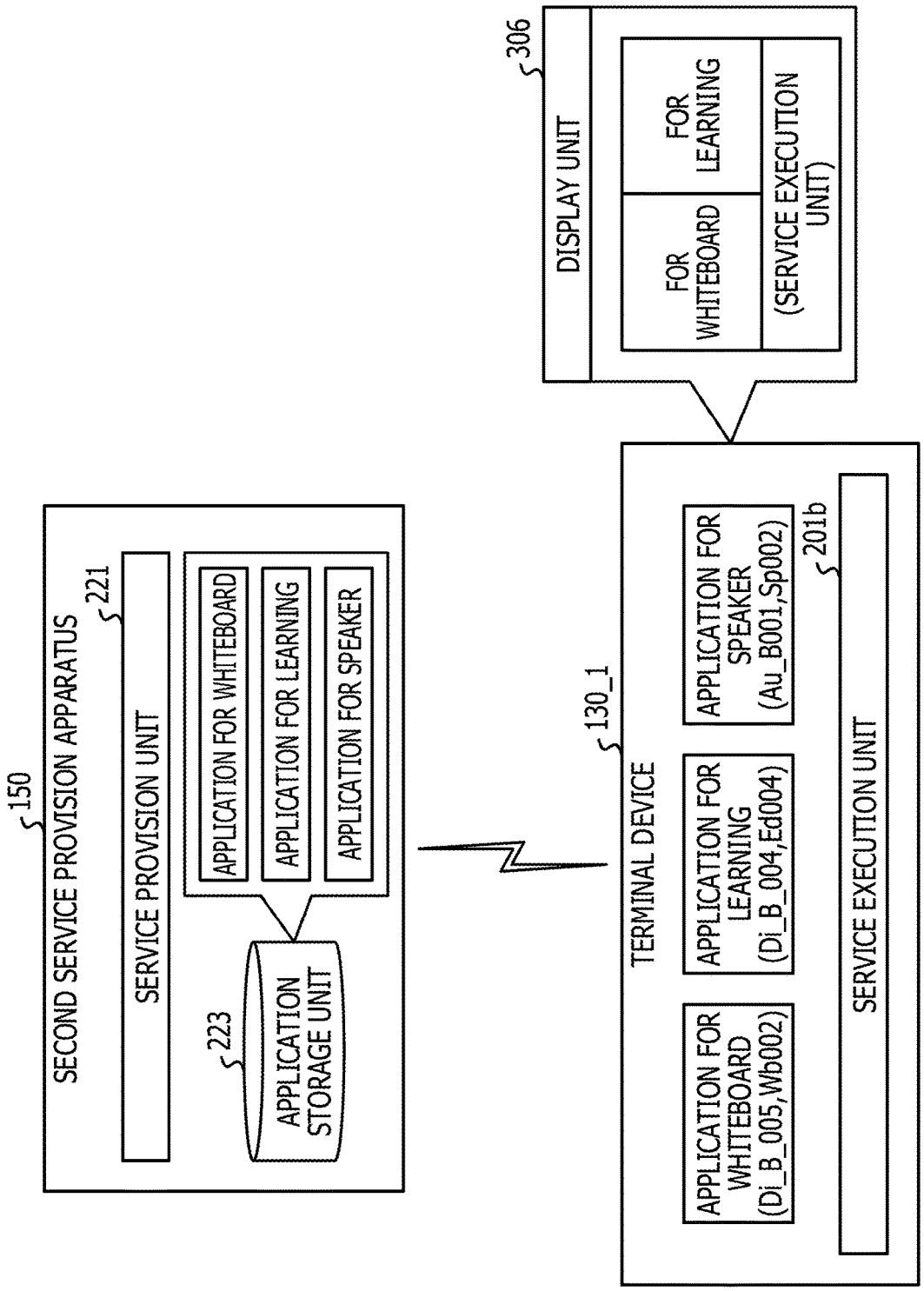

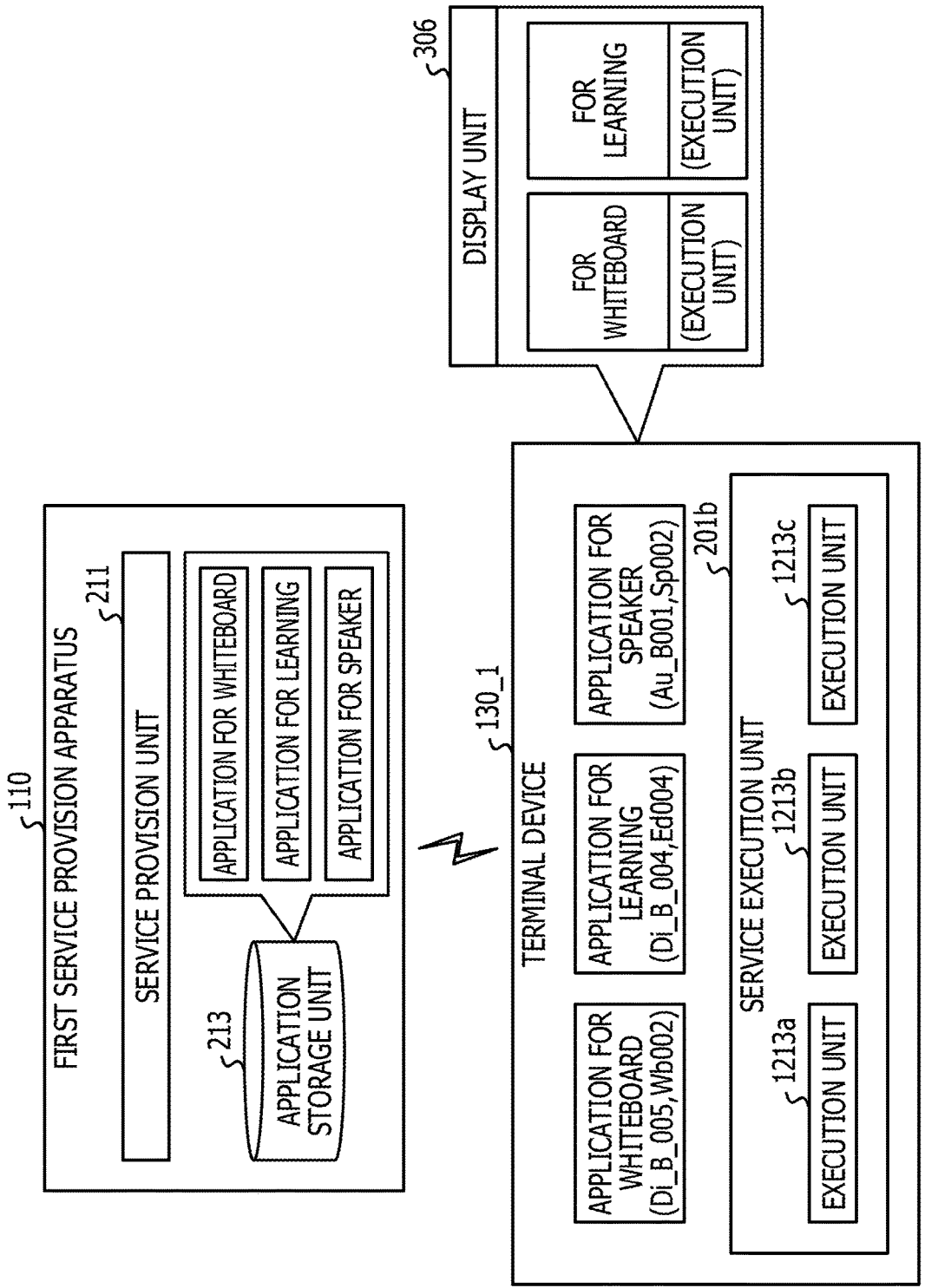

US 10,382,351 B2

SERVICE PROVISIONING AND APPLICATION DISTRIBUTION BASED ON TERMINAL LOCATION

CROSS-REFERENCE TO RELATED APPLICATION

This application is based upon and claims the benefit of priority of the prior Japanese Patent Application No. 2015-162009, filed on Aug. 19, 2015, the entire contents of which are incorporated herein by reference.

FIELD

The embodiments discussed herein are related to a service provision method, a system, and an apparatus.

BACKGROUND

With recent proliferation of terminals such as smartphones and tablets, there have been an increasing number of cases where users use applications by downloading them on the spot as requested. In addition, application distribution services suitable for such uses also have been proposed.

As an example, an application distribution service is known which distributes an application to terminals checked in to a service provided in a predetermined area so that only the users located in the predetermined area may use the application. In this service, when a user moves out from the predetermined area (outside the area provided with the distribution service), the application distributed to the terminal of the user is automatically deleted.

Related techniques are disclosed in, for example, Japanese Laid-open Patent Publication Nos. 2006-012076, 2014-191686, 2000-207216, and 2014-010537.

However, the above-described service is inconvenient for a user who wants to use a distributed application outside the area provided with the service. For instance, when a user wants to use an application, distributed in a school, at the user's house to do homework or the like, the above-described service is inconvenient because the service does not allow the application to be used outside the school.

SUMMARY

According to an aspect of the invention, a service provision method executed by a system including a terminal configured to use a service and a service provision apparatus configured to provide the service, the service providing method includes collecting resource information of an output device coupled to the service provision apparatus when the terminal checks in to the service provision apparatus, providing a first application to the terminal and a second application to the output device from the service provision apparatus when the output device is usable in accordance with the resource information, and providing a third application to the terminal from the service provision apparatus, the third application generated on the basis of the first application and the second application, when the output device is unusable in accordance with the resource information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A to 4C are each a table illustrating example resource information;

FIG. 5 is a table illustrating example resource management information on the first service provision apparatus;

FIG. 6 is a table illustrating example resource management information on a second service provision apparatus;

FIG. 8 is a first diagram illustrating a result of distribution of applications when a service for learning is provided by the second service provision apparatus;

FIG. 17 is a second diagram illustrating a result of distribution of applications when the service for learning is provided by the first service provision apparatus;

DESCRIPTION OF EMBODIMENTS

According to an aspect of the embodiments, the area provided with a service is extended. Hereinafter, embodiments will be described with reference to the accompanying drawings. It is to be noted that in the present description and the drawings, components having substantially the same functional configuration are labeled with the same symbol, and redundant description is omitted.

[First Embodiment]

First, a learning system will be described, which is an example of a service provision system utilizing a service provision apparatus according to a first embodiment. Although the service provision apparatus according to the first embodiment allows various distribution services to be provided in various situations, a case will be described herein where the service provision apparatus is applied to a learning system that provides a service for learning by distributing applications related to learning materials. In particular, a learning system will be described, which allows a user (for instance, a student) provided with a service for learning in a school to continuously utilize the service even at home.

Figure 1:
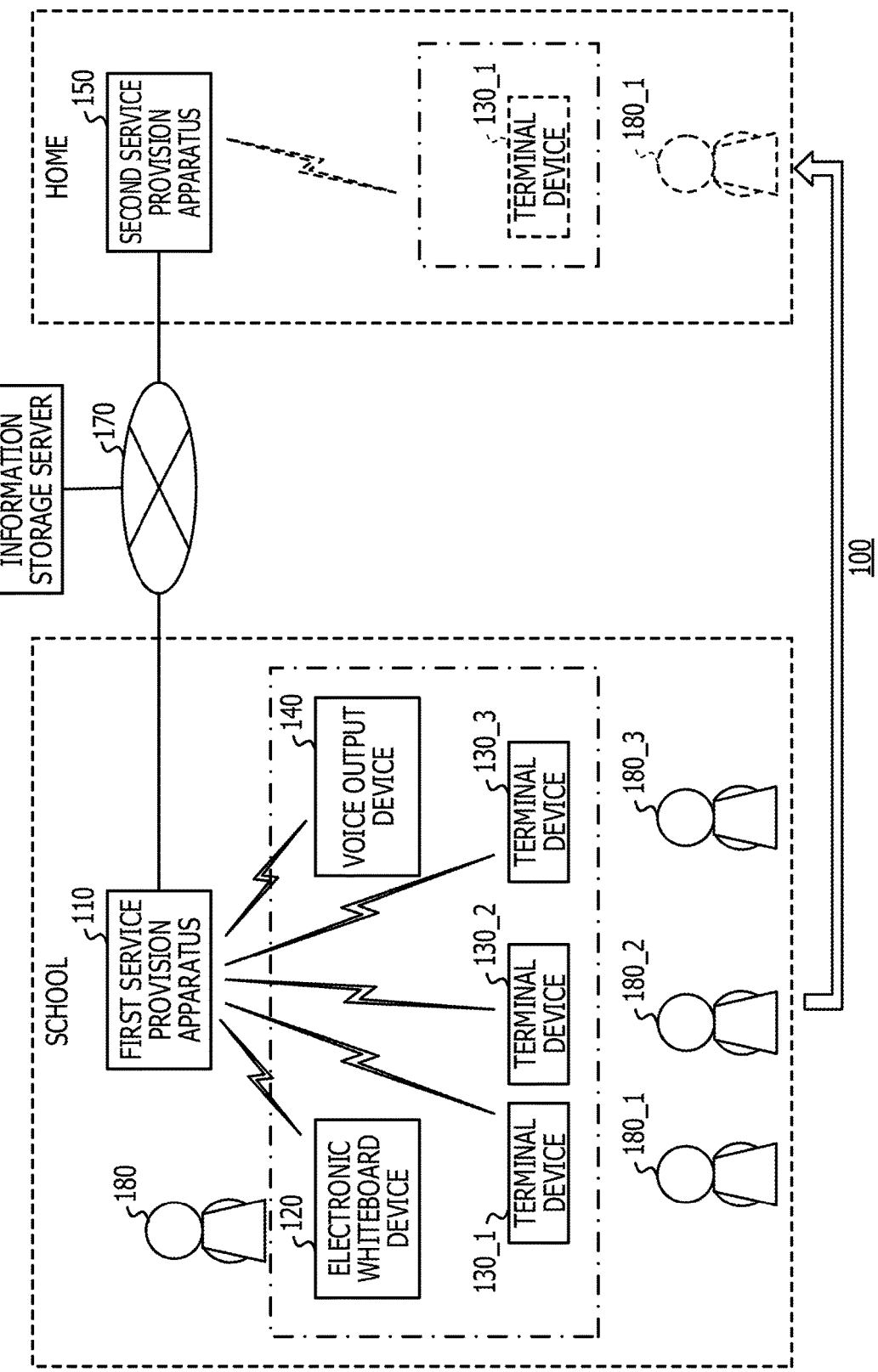
FIG. 1 illustrates an example learning system utilizing a service provision apparatus.

FIG. 1 illustrates an example learning system utilizing the service provision apparatus. As illustrated in FIG. 1, a learning system 100 has a first service provision apparatus 110, an electronic whiteboard device 120, terminal devices 130_1 to 130_3, a voice output device 140, a second service provision apparatus 150, and an information storage server 160.

The information storage server 160, and the first service provision apparatus 110 and the second service provision apparatus 150 are connected via a network 170 which is represented by the Internet or a local area network (LAN).

In the example of FIG. 1, the first service provision apparatus 110, the electronic whiteboard device 120, and the voice output device 140 are installed in a school, and the second service provision apparatus 150 is installed in the house of a user 180_1 who has the terminal device 130_1.

In a school, the first service provision apparatus 110 distributes an "application for whiteboard", which is a display application for explanation, to the electronic whiteboard device 120. Thus, a user (for instance, a teacher) 180 may give an explanation while looking at the application for whiteboard displayed on the electronic whiteboard device 120.

In addition, the first service provision apparatus 110 distributes an "application for learning", which is a display application for notebook, to the terminal devices 130_1 to 130_3. Thus, users (for instance, students) 180_1 to 180_3 may take notes while looking at the application for learning displayed on the terminal devices 130_1 to 130_3, respectively. It is to be noted that the terminal devices 130_1 to 130_3 are each a mobile terminal such as a smartphone or a tablet, which may be carried by the users 180_1 to 180_3. Although the example of FIG. 1 illustrates the case where the first service provision apparatus 110 distributes the application for learning to three terminal devices 130_1 to 130_3, the number of terminal devices, to which the application for learning is distributed by the first service provision apparatus 110, is not limited to three.

Furthermore, the first service provision apparatus 110 distributes an "application for speaker", which is a voice application for explanation, to the voice output device 140. Thus, the users 180_1 to 180_3 are able to hear the voice for explanation. It is to be noted that the voice output device 140 is a device that has a voice output function such as a speaker.

On the other hand, neither the electronic whiteboard device 120 nor the voice output device 140 is provided at home. For this reason, the second service provision apparatus 150, when providing the service for learning, collectively distributes the application for whiteboard, the application for learning, and the application for speaker to the terminal device 130_1.

The school and home have different environments like this when the service for learning is provided by the respective service provision apparatuses (the first service provision apparatus 110, the second service provision apparatus 150). The environment when the service for learning is provided refers to the types and number of resources by which applications are executed, the applications being distributed when the service for learning is provided. The types and number of resources depend on the types and number of devices connectable to each service provision apparatus, and on the types and number of output functions (such as a display function, voice output function) of the connectable devices. Hereinafter, "resources" refer to the resources by which applications are executed using the output functions of the devices connected to each service provision apparatus when the service for learning is provided. Therefore, the difference in environment when the service for learning is provided indicates the difference in the types and number of resources available to the service provision apparatuses under respective environments.

In the present embodiment, the second service provision apparatus 150 determines a distribution destination of an application and regenerates the application for each distribution destination in consideration of the difference in available resources between the second service provision apparatus 150 and the first service provision apparatus 110. In addition, the second service provision apparatus 150 determines applications to be distributed based on the applications distributed by the first service provision apparatus 110.

It is to be noted that the second service provision apparatus 150 obtains via the information storage server 160 information on the resources and distributed applications when the user 180_1 is provided with the service for learning in a school. Hereinafter, "resource management information" refers to the information on the resources and distributed applications under each environment. Thus, the service provision apparatus 150 is able to determine an application to be distributed and its distribution destination, and to regenerate the application based on the resource management information.

Consequently, with the learning system 100, the user 180_1 who has returned home is able to review lessons and do additional exercises (homework) at home by utilizing the same applications as the application distributed by the first service provision apparatus 110.

In other words, the service for learning same as that in a school may be continuously utilized even at home, and thus the area provided with the service for learning, which is provided to the terminal device 130_1 in a predetermined area (in a school), may be extended to outside the predetermined area (home).

Figure 2:
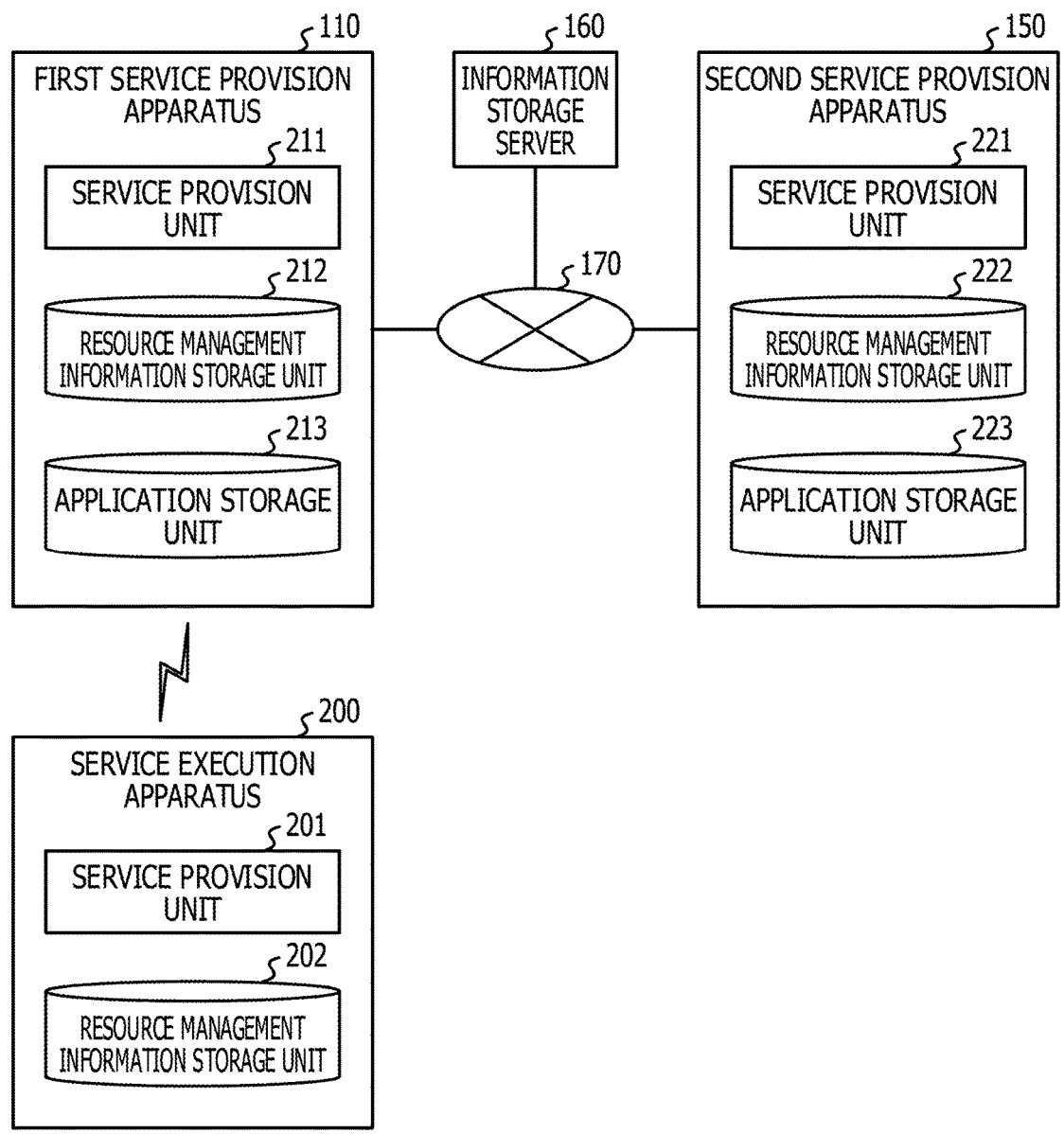
FIG. 2 is a diagram illustrating an example functional configuration of the learning system.

Next, the functional configuration of the entire learning system 100 will be described. FIG. 2 is a diagram illustrating an example functional configuration of the learning system. It is to be noted that in the example of FIG. 2, the electronic whiteboard device 120, the terminal devices 130_1 to 130_3, and the voice output device 140 which are connected to the first service provision apparatus 110 are collectively depicted as a service execution apparatus 200 for the sake of simplifying the description.

The first service provision apparatus 110 is an apparatus that provides a service for learning. A service provision program is installed in the first service provision apparatus 110 which serves as a service provision unit 211 by executing the program.

When the service execution apparatus 200 is in a predetermined area, the service provision unit 211 receives check-in to the service for learning from the service execution apparatus 200. It is to be noted that the predetermined area indicates a predetermined area related to the first service provision apparatus 110, such as an area in which radio waves emitted from the first service provision apparatus 110 may be received, or an area in which an SSID may be obtained. The check-in refers to becoming a state in which in response to a check-in request sent from the first service provision apparatus 110, the service execution apparatus 200 is connected to the first service provision apparatus 110 and is enabled to be provided with the service for learning.

The service provision unit 211 makes a request to the service execution apparatus 200 which has received check-in, for transmission of information on the resources owned by the service execution apparatus 200 (hereinafter information on the resources owned by each service execution apparatus is referred to as "resource information"). The service provision unit 211 also collects the resource information transmitted from the service execution apparatus 200 in response to a transmission request for resource information, and stores the resource information in the resource management information storage unit 212 as resource management information.

The service provision unit 211 determines assignment of applications to be executed by the resources, according to the resource management information stored in the resource management information storage unit 212, and updates the resource management information by storing a result of the assignment in the resource management information storage unit 212. In addition, the service provision unit 211 reads an application with the application determined for assignment from an application storage unit 213, and regenerates and distributes the application for and to each distribution destination (each of the service execution apparatuses 200 having the resources).

The service provision unit 211 starts to provide the service for learning by performing control to cause each resource to execute the corresponding applications distributed to the service execution apparatus 200.

In addition, the service provision unit 211, when receiving a continuation instruction from the service execution apparatus 200, transmits the resource management information and the like stored in the resource management information storage unit 212 to the information storage server 160. The continuation instruction refers to an instruction issued by the service execution apparatus 200 for requesting another service provision apparatus (for instance, the second service provision apparatus 150) to continuously provide the service for learning, when the service execution apparatus 200 is in a state in which provision of the service for learning is not receivable. It is to be noted that the state in which provision of the service for learning is not receivable includes the case where provision of the service for learning by the service provision unit 211 has ended and the case where the service execution apparatus 200 has moved out from the predetermined area.

Transmission of the resource management information to the information storage server 160 allows the service execution apparatus 200 to be provided with the service for learning from the second service provision apparatus 150 based on the resource management information. A state in which the second service provision apparatus 150 is able to provide the service for learning in this manner using the resource management information relevant in the service for learning provided by the first service provision apparatus is referred to as a state in which "check-in to the service for learning is maintained". In the present embodiment, transmission of a continuation instruction allows the check-in of the service execution apparatus 200 to the service for learning to be maintained.

The service execution apparatus 200 is an apparatus that is provided with the service for learning by executing the applications distributed from the first service provision apparatus 110. A service execution program is installed in the service execution apparatus 200 which serves as a service execution unit 201 by executing the program.

The service execution unit 201 checks in to the service for learning provided by the first service provision apparatus 110. Alternatively, in a state in which the check-in to the service for learning provided by the first service provision apparatus 110 is maintained, the service execution unit 201 checks in to the service for learning provided by the second service provision apparatus 150.

The service execution unit 201, when receiving a transmission request for the resource information from the first service provision apparatus 110 or the second service provision apparatus 150, reads the resource information on the apparatus stored in the resource information storage unit 202. In addition, the service execution unit 201 transmits the read resource information to the first service provision apparatus 110 or the second service provision apparatus 150.

The service execution unit 201 receives applications distributed from the first service provision apparatus 110 or the second service provision apparatus 150 in response to the transmission of the resource information. Also, the service execution unit 201 executes the distributed applications using the resources of the apparatus 110 or 150 under the control of the service provision unit 211 or 221.

Although the second service provision apparatus 150 is an apparatus that provides the service for learning and is a separate body from the first service provision apparatus 110, the second service provision apparatus 150 has the same functions as those of the first service provision apparatus 110.

However, when the service for learning is provided to the service execution apparatus 200 which maintains the check-in to the service for learning, the service provision unit 221 of the second service provision apparatus 150 obtains the resource management information stored in the information storage server 160.

Thus, the service provision unit 221 is able to provide the service for learning based on the resource management information stored in the information storage server 160. Specifically, the service provision unit 221 is able to regenerate and distribute the same applications as the applications distributed when the service for learning is provided by the first service provision apparatus 110, according to the resources available to the second service provision apparatus 150.

The information storage server 160 stores the resource management information and the like which are transmitted from the first service provision apparatus 110. In addition, in response to a request from the second service provision apparatus 150, the information storage server 160 transmits the stored resource management information to the second service provision apparatus 150.

Next, the hardware configuration of each of the first service provision apparatus 110, the service execution apparatus 200 (the electronic whiteboard device 120, the terminal devices 130_1 to 130_3, the voice output device 140), the second service provision apparatus 150, and the information storage server 160 will be described. It is to be noted that each of the first service provision apparatus 110, the service execution apparatus 200, the second service provision apparatus 150, and the information storage server 160 has the same hardware configuration. For this reason, the hardware configuration of the first service provision apparatus will be described with reference to FIG. 3 below.

Figure 3:
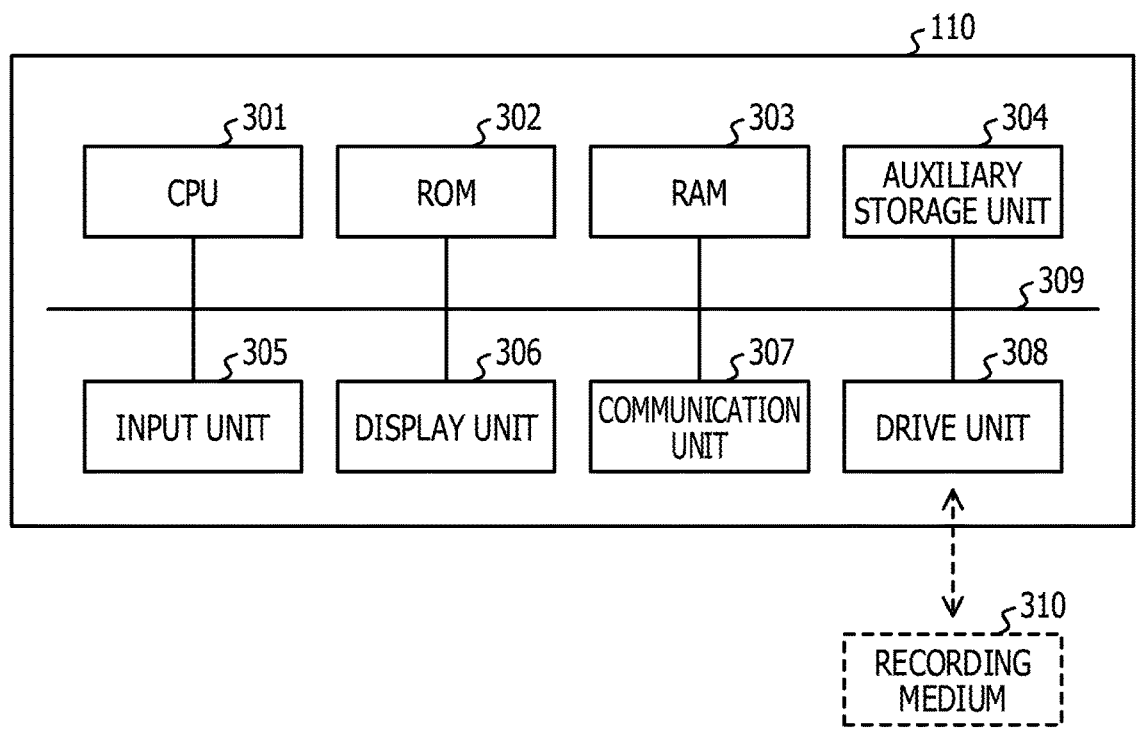
FIG. 3 is a diagram illustrating an example hardware configuration of a first service provision apparatus.

FIG. 3 is a diagram illustrating an example hardware configuration of the first service provision apparatus. As illustrated in FIG. 3, the first service provision apparatus 110 includes a CPU 301, a read only memory (ROM) 302, and a random access memory (RAM) 303. In addition, the first service provision apparatus 110 includes an auxiliary storage unit 304, an input unit 305, a display unit 306, a communication unit 307, and a drive unit 308. It is to be noted that the units of the first service provision apparatus 110 are connected to one another via a bus 309.

The CPU 301 is a computer that executes various programs (for instance, a service provision program) installed in the auxiliary storage unit 304. The ROM 302 is a nonvolatile memory. The ROM 302 serves as a main memory unit that stores various programs, data, or the like to be used by the CPU 301 for executing various programs stored in the auxiliary storage unit 304. Specifically, the ROM 302 stores boot programs such as a basic input/output system (BIOS) or an extensible firmware interface (EFI).

The RAM 303 is a volatile memory such as a dynamic random access memory (DRAM) or a static random access memory (SRAM), and serves as the main memory unit. The RAM 303 provides a workspace used when the various programs stored in the auxiliary storage unit 304 are executed by the CPU 301.

The auxiliary storage unit 304 stores various programs installed in the first service provision apparatus 110 and information (such as resource management information and the like) which is used when the various programs are executed. In addition, the auxiliary storage unit 304 stores applications (such as the application for whiteboard, the application for learning, the application for speaker) which are distributed by executing the various programs.

The input unit 305 is used when various instructions are inputted to the first service provision apparatus 110. The display unit 306 displays an internal state of the first service provision apparatus 110.

The communication unit 307 is a device for communicating with an external device (such as the service execution apparatus 200, the information storage server 160) to be connected to the first service provision apparatus 110. An application to be distributed to the service execution apparatus 200 is transmitted via the communication unit 307. Also, resource information to be transmitted from the service execution apparatus 200 is received via the communication unit 307. Furthermore, resource management information and the like to be transmitted to the information storage server 160 are transmitted via the communication unit 307.

The drive unit 308 is a device for setting a recording medium 310. The recording medium 310 referred herein includes a medium that records information optically, electrically, or magnetically, such as a CD-ROM, a flexible disk, a magneto-optical disk. In addition, the recording medium 310 includes a semiconductor memory or the like that records information electrically, such as a ROM, a flash memory.

It is to be noted that the service provision program in the auxiliary storage unit 304 is stored therein, for instance, in the following manner: distributed recording medium 310 is set to the drive unit 308, and the service provision program recorded in the recording medium 310 is read by the drive unit 308. Alternatively, the service provision program may be stored by being received via the communication unit 307.

Next, the resource information stored in the resource information storage unit 202 of the service execution apparatus 200 will be described. FIGS. 4A to 4C are each a table illustrating example resource information, FIG. 4A illustrates example resource information 410 on the electronic whiteboard device 120, FIG. 4B illustrates example resource information 421 to 423 on the terminal devices 130_1 to 130_3, and FIG. 4C illustrates example resource information 430 on the voice output device 140. As illustrated in FIGS. 4A to 4C, the resource information includes "device ID", "output function", and "controller type" as the items of information.

The "device ID" stores an identifier (identifier specific to the device) for identifying each service execution apparatus. The "device ID" stores a different identifier for each device even for the same type of service execution apparatus. Thus, different identifiers are stored for the electronic whiteboard device 120, the terminal devices 130_1 to 130_3, and the voice output device 140. Even for the same terminal device, different identifiers are stored for the terminal device 130_1, the terminal device 130_2, and the terminal device 130_3.

The "output function" stores information on the output function owned by each service execution apparatus. The example of FIGS. 4A to 4C indicates that the electronic whiteboard device 120 has a display function as the output function. The example also indicates that the terminal devices 130_1 to 130_3 each have a display function and a voice output function as the output function. In addition, the example indicates that the voice output device 140 has a voice output function as the output function.

The "controller type" stores information indicating the types of applications executable by each service execution apparatus when the service for learning is provided. For instance, in the case of the electronic whiteboard device 120, the "controller type" stores "WhiteBoard" which indicates that the application for whiteboard is executable.

On the other hand, in the case of the terminal device 130, the "controller type" stores "EducationApp" indicating that the application for learning is executable, and also stores "WhiteBoard" indicating that the application for whiteboard is executable. In addition, the "controller type" stores "Speaker" indicating that the application for speaker is executable.

In the case of the voice output device 140, the "controller type" stores "Speaker" indicating that the application for speaker is executable.

Since the resource information includes the "output function" and the "controller type" like this, it is possible for the service provision unit 211 to determine the resource owned by each service execution apparatus 200 based on the combination of the "output function" and the "controller type". Also, it is possible for the service provision unit 211 to determine usable applications when the service for learning is provided, based on the determined resource.

For instance, the electronic whiteboard device 120 may be determined to have a resource that executes an application for whiteboard using a display function, based on the combination of the output function="display" and the controller type="WhiteBoard".

Also, the terminal devices 130_1 to 130_3 each may be determined to have a resource that executes an application for learning using a display function, based on the combination of the output function="display" and the controller type="EducationApp". Also, the terminal devices 130_1 to 130_3 each may be determined to have a resource that executes an application for whiteboard using a display function, based on the combination of the output function="display" and the controller type="WhiteBoard". In addition, the terminal devices 130_1 to 130_3 each may be determined to have a resource that executes an application for speaker using a voice output function, based on the combination of the output function="voice" and the controller type="Speaker".

Also, the voice output device 140 may be determined to have a resource that executes an application for speaker using a voice output function, based on the combination of the output function="voice" and the controller type="Speaker".

Consequently, it is possible for the service provision unit 211 to determine the application for whiteboard, the application for learning, and the application for speaker as usable applications when the service for learning is provided.

Next, the resource management information stored in the resource management information storage unit 212 of the first service provision apparatus 110 will be described. FIG. 5 is a table illustrating example resource management information on the first service provision apparatus. Resource management information 500 stores the resource information of each service execution apparatus 200 which has checked in to the service for learning provided by the first service provision apparatus 110, and stores the applications assigned to each resource included in the resource information.

Specifically, the resource management information 500 includes "device ID", "output function", "output object", "controller type", and "controller object" as the items of information.

The "device ID", "output function", and "controller type" store relevant resource information received from each service execution apparatus 200.

The "output object", "controller object" store applications for which assignment is determined by the service provision unit 211 based on the resource information received from each service execution apparatus 200.

For instance, in the case of the electronic whiteboard device 120 with the device ID="A001", the service provision unit 211 determines that the electronic whiteboard device 120 has a resource that executes the application for whiteboard. Thus, in the example of FIG. 5, the service provision unit 211 has determined that the output object="Di_A_001" and the controller object="Wb001" are assigned to the application for whiteboard.

In the case of the terminal device 130_1 with the device ID="B001", the service provision unit 211 determines that the terminal device 130_1 has a resource that executes the application for learning, the application for speaker, and the application for whiteboard. Among these, in the example of FIG. 5, the service provision unit 211 has determined that the output object="Di_B_001" and the controller object="Ed001" are assigned to the application for learning.

Similarly, in the case of the terminal device 130_2 with the device ID="B002", the service provision unit 211 determines that the terminal device 130_2 has a resource that executes the application for learning, the application for speaker, and the application for whiteboard. Among these, in the example of FIG. 5, the service provision unit 211 has determined that the output object="Di_B_002" and the controller object="Ed002" are assigned to the application for learning.

Similarly, in the case of the terminal device 130_3 with the device ID="B003", the service provision unit 211 determines that the terminal device 130_3 has a resource that executes the application for learning, the application for speaker, and the application for whiteboard. Among these, in the example of FIG. 5, the service provision unit 211 has determined that the output object="Di_B_003" and the controller object="Ed003" are assigned to the application for learning.

On the other hand, in the case of the voice output device 140 with the device ID="C001", the service provision unit 211 determines that the voice output device 140 has a resource that executes the application for speaker. Thus, in the example of FIG. 5, the service provision unit 211 has determined that the output object="Au_C_001" and the controller object="Sp001" are assigned to the application for speaker.

Next, the resource management information stored in the resource management information storage unit 222 of the second service provision apparatus 150 will be described. FIG. 6 is a table illustrating example resource management information on the second service provision apparatus. The resource management information 600 stores the resource information of a device (here, the terminal device 130_1) which has checked in to the service for learning provided by the second service provision apparatus 150, and information on the applications assigned to each resource included in the resource information.

Similarly to the resource management information 500, the resource management information 600 includes "device ID", "output function", "output object", "controller type", and "controller object" as the items of information.

In the example of FIG. 6, the terminal device 130_1 has checked in, and thus each of the "device ID", "output function", and "controller type" stores relevant resource information received from the terminal device 130_1.

On the other hand, each of the "output object" and "controller object" stores an object according to the assignment of applications determined by the service provision unit 221. It is to be noted that when an application to be assigned to each resource is determined, the service provision unit 221 obtains and analyzes the resource management information 500.

According to the resource management information 500, the first service provision apparatus 110, when providing the service for learning, distributes the application for whiteboard, the application for learning, and the application for speaker. Thus, the service provision unit 221 determines assignment of the applications to each resource so that the applications are distributed.

In the example of FIG. 6, the service provision unit 221 has determined that the output object="Di_B_004" and the controller object="Ed004" are assigned to the application for learning. Also, the service provision unit 221 has determined that the output object="Di_B_005" and the controller object="Wb002" are assigned to the application for whiteboard. In addition, the service provision unit 221 has determined that the output object="Au_B_002" and the controller object="Sp002" are assigned to the application for speaker.

In this manner, the service provision unit 221 is able to distribute the same applications as the applications distributed when the service for learning is provided by the first service provision apparatus 110, according to the resources available to the second service provision apparatus 150.

Figure 7:
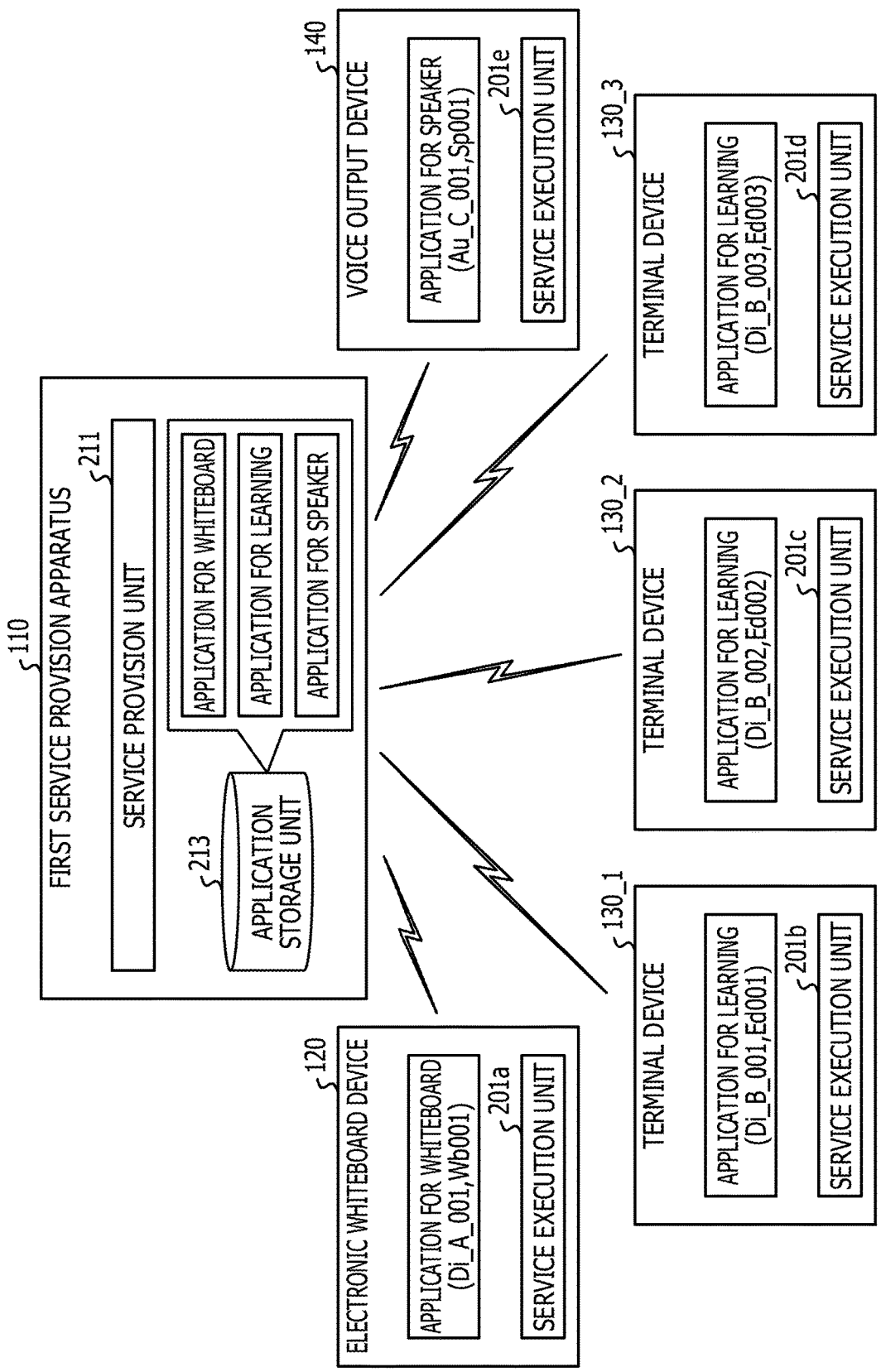
FIG. 7 illustrates a result of distribution of applications when a service for learning is provided by the first service provision apparatus.

Next, a result of distribution will be described in the case where the service provision unit 211 of the first service provision apparatus 110 determines assignment of applications and distributes assigned applications to each service execution apparatus 200. FIG. 7 illustrates a result of distribution of applications when the service for learning is provided by the first service provision apparatus.

As illustrated in FIG. 7, the application for whiteboard is distributed to the electronic whiteboard device 120 and is executed by a service execution unit 201a. Also, the application for learning is distributed to each of the terminal devices 130_1 to 130_3, and is executed by service execution units 201b to 201d. In addition, the application for speaker is distributed to the voice output device 140, and is executed by a service execution unit 201e.

In this manner, when the service for learning is provided, the service provision unit 211 distributes usable applications to each service execution apparatus according to the determined assignment, the usable applications being determined according to a resource.

Next, a result of distribution will be described in the case where the service provision unit 221 of the second service provision apparatus 150 determines assignment of applications based on the resource management information 500 and available resources, and distributes the applications to the terminal device 130_1. FIG. 8 is a diagram illustrating a result of the distribution of applications when the service for learning is provided by the second service provision apparatus.

As illustrated in FIG. 8, the applications including the application for whiteboard, the application for learning, and the application for speaker are distributed to the terminal device 130_1, and are executed by the service execution unit 201b.

In this manner, the service provision unit 221 distributes the applications, which have been determined based on the resource management information 500 and available resources, to the service execution apparatuses according to the determined assignment.

As is obvious from the contrast between FIGS. 7 and 8, the second service provision apparatus 150 determines a distribution destination of each application in consideration of the difference between the resources available to the first service provision apparatus 110 and the resources available to the second service provision apparatus 150. Therefore, a user provided with the service for learning in a school is able to continuously utilize the service for learning even at home.

As illustrated in FIG. 8, in the display unit 306, the display screen of the application for whiteboard and the display screen of the application for learning both executed by the service execution unit 201b in a common execution environment are displayed in a common window.

Next, the flow of processing in the learning system 100 since the service for learning is provided in a school until the service for learning is continuously utilized at home will be described with reference to FIGS. 9A to 11C. It is to be noted that in FIGS. 9A to 11C, only one (the terminal device 130_1) of three terminal devices 130_1 to 130_3 is illustrated for the sake of simplifying the description.

Figure 9A:
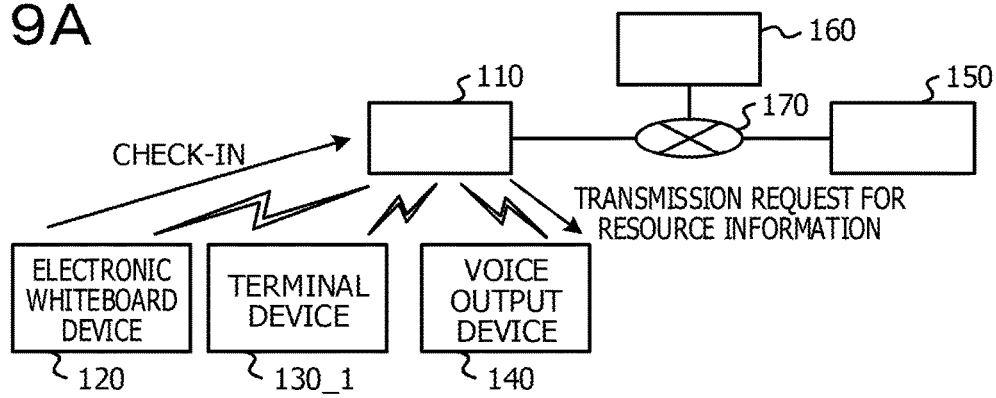
FIGS. 9A to 9C provide first diagrams for explaining the flow of processing up to the point when the first service provision apparatus provides the service for learning.
Figure 9B:
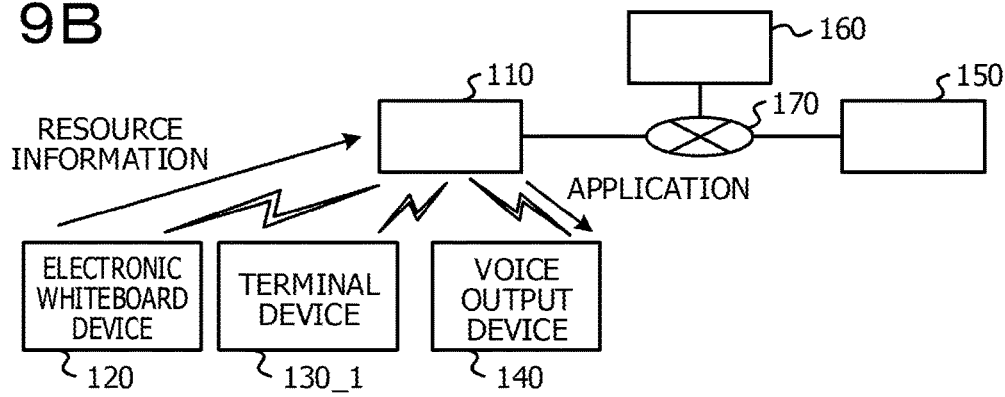
Figure 9C:
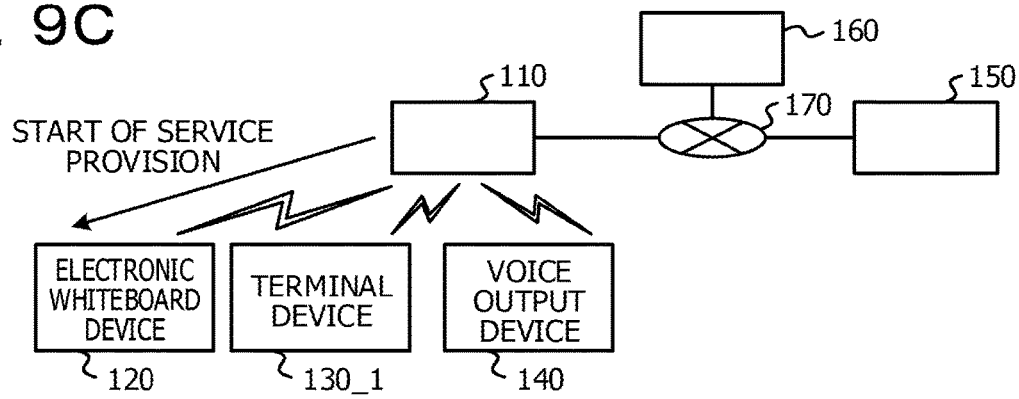

First, the flow of processing up to the point when the first service provision apparatus 110 provides the service for learning in a school will be described. FIGS. 9A to 9C provide diagrams for explaining the flow of processing up to the point when the first service provision apparatus provides the service for learning.

As illustrated in FIG. 9A, when the electronic whiteboard device 120, the terminal device 130_1, and the voice output device 140 check in to the service for learning, the first service provision apparatus 110 makes a transmission request for the resource information to each service execution apparatus.

Each service execution apparatus, which has received the transmission request for the resource information, reads the resource information related to the checked-in service from a corresponding resource information storage unit 202, and transmits the resource information to the first service provision apparatus 110 as illustrated in FIG. 9B. Specifically, the electronic whiteboard device 120, the terminal device 130_1, and the voice output device 140 transmit the resource information 410, the resource information 421, and the resource information 430, respectively to the first service provision apparatus 110.

The first service provision apparatus 110, which has received the resource information 410, 421, 430, determines usable applications when the service for learning is provided, determines assignment of applications, and updates the resource management information 500. In addition, the first service provision apparatus 110 distributes the applications to each service execution apparatus based on the resource management information 500 (FIG. 9B). Specifically, the application for whiteboard, the application for learning, and the application for speaker are distributed to the electronic whiteboard device 120, the terminal device 130_1, and the voice output device 140, respectively.

Consequently, as illustrated in FIG. 9C, the first service provision apparatus 110 controls each distributed application, and starts to provide the service for learning.

Figure 10A:
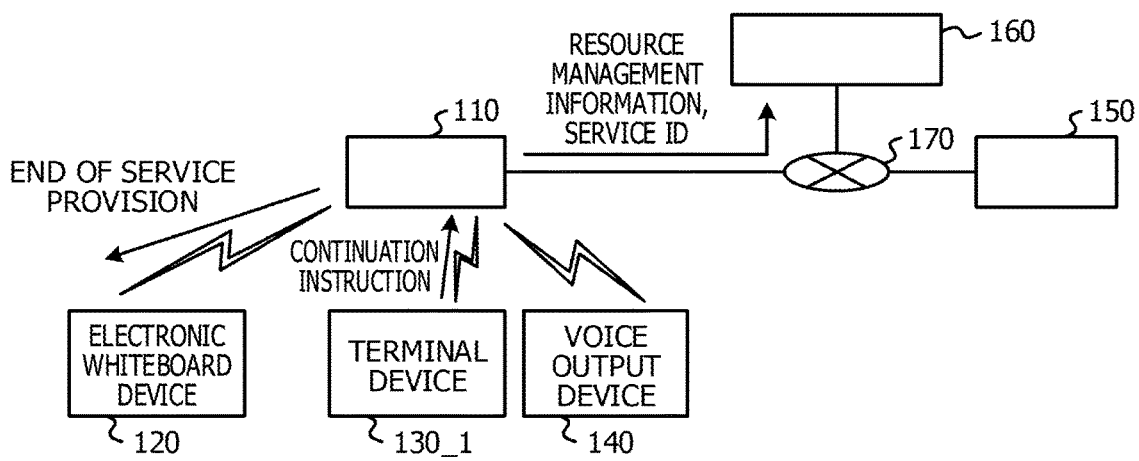
FIGS. 10A and 10B provide first diagrams for explaining the flow of processing until a terminal device is moved since the provision of the service for learning by the first service provision apparatus ends.
Figure 10B:
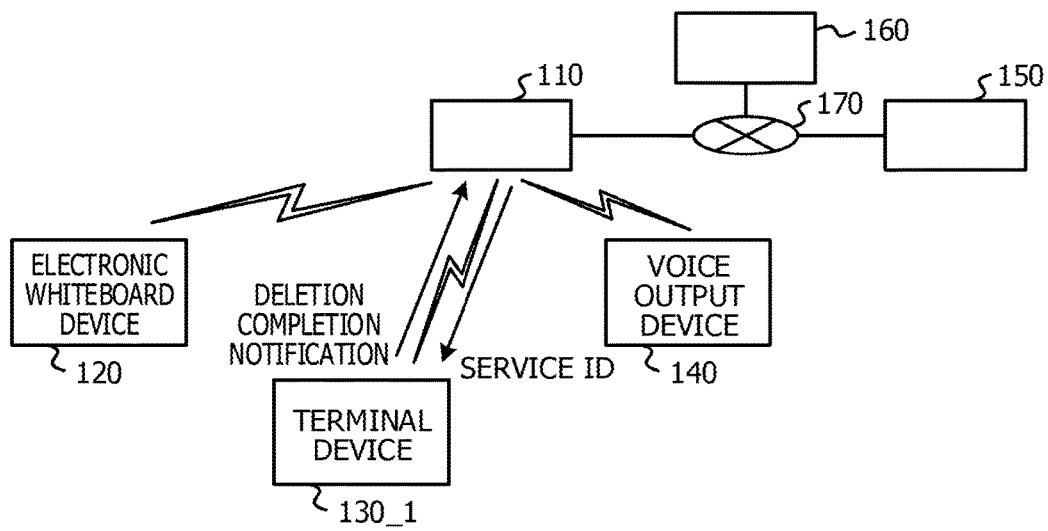

Next, the flow of processing until the terminal device 130_1 is moved since the provision of the service for learning by the first service provision apparatus 110 in a school ends will be described. FIGS. 10A and 10B provide diagrams for explaining the flow of processing until the terminal device is moved since the provision of the service for learning by the first service provision apparatus ends.

As illustrated in FIG. 10A, the first service provision apparatus 110 sends a notification of end of provision of the service for learning to the electronic whiteboard device 120, the terminal device 130_1, and the voice output device 140.

Upon receiving the notification, the electronic whiteboard device 120, the terminal device 130_1, and the voice output device 140 each determine whether or not the service for learning is to be continuously provided via another service provision apparatus. When it is determined that the service for learning is to be continuously provided via another service provision apparatus, a continuation instruction is transmitted to the first service provision apparatus 110. The example of FIG. 10A indicates that the terminal device 130_1 has transmitted a continuation instruction.

Because the continuation instruction has been received from the terminal device 130_1, the first service provision apparatus 110 determines that the terminal device 130_1 uses the application distributed by the first service provision apparatus 110 even when the terminal device 130_1 is located outside a predetermined area.

In this case, the first service provision apparatus 110 transmits the resource management information 500 stored in the resource management information storage unit 212 along with the service ID of the service for learning to the information storage server 160.

Thus, the check-in of the terminal device 130_1 to the service for learning provided by the first service provision apparatus 110 is maintained.

Assume that subsequently, the user 180_1 carries the terminal device 130_1 and moves out of a predetermined area. FIG. 10B illustrates the manner in which the user 180_1 carries the terminal device 130_1 and moves out of a predetermined area.

The terminal device 130_1, which has transmitted a continuation instruction, deletes the application (the application for learning) distributed by the first service provision apparatus 110, and transmits a deletion completion notification indicating completion of deletion to the first service provision apparatus 110.

The first service provision apparatus 110, after receiving the deletion completion notification from the terminal device 130_1, transmits the service ID of the service for learning to the terminal device 130_1. Thus, when the terminal device 130_1 checks in to the second service provision apparatus 150, the second service provision apparatus 150 is able to recognize that the checked-in terminal device 130_1 has been provided with the service for learning identified by the service ID. In addition, the service for learning, with which the checked-in terminal device 130_1 is provided, is uniquely identifiable by the second service provision apparatus 150.

Figure 11A:
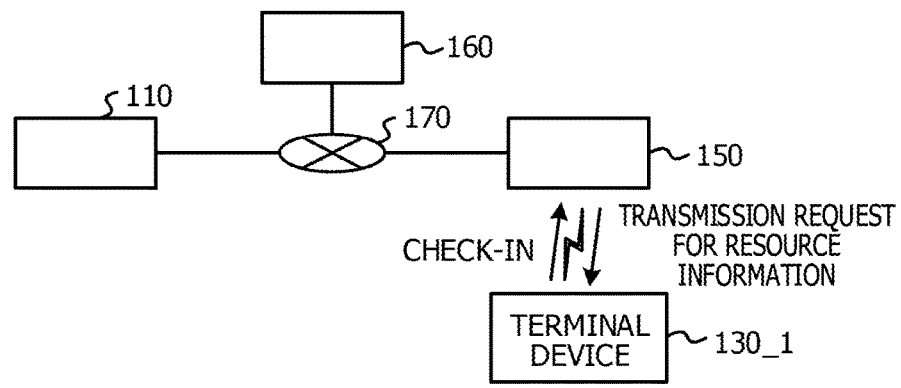
FIGS. 11A to 11C provide first diagrams for explaining the flow of processing up to the point when the second service provision apparatus provides the service for learning.
Figure 11B:
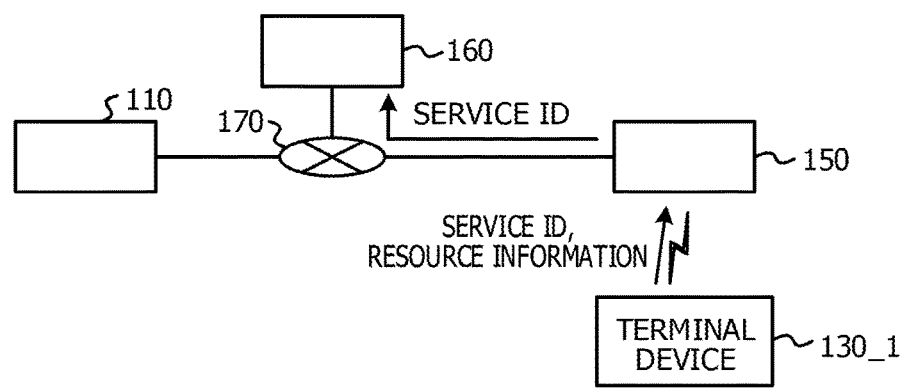
Figure 11C:
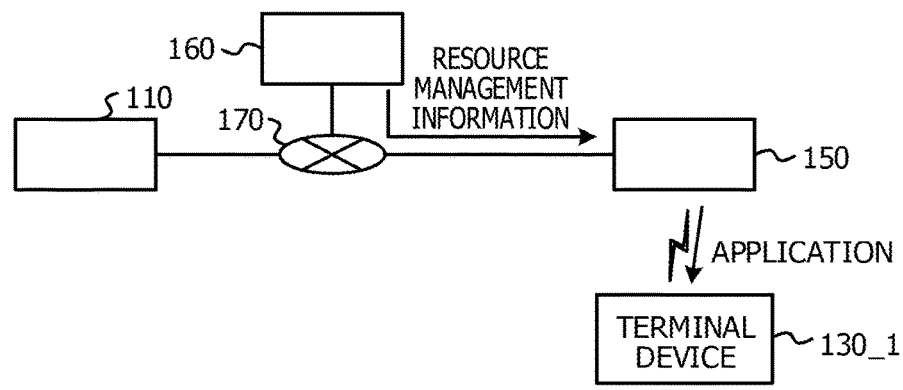

Next, the flow of processing after return of the user 180_1 to home up to the point when the terminal device 130_1 is provided with the service for learning by the second service provision apparatus 150 will be described. FIGS. 11A to 11C provide diagrams for explaining the flow of processing up to the point when the second service provision apparatus provides the service for learning.

As illustrated in FIG. 11A, when the terminal device 130_1 checks in, the second service provision apparatus 150 makes a transmission request for the resource information to the terminal device 130_1.

The terminal device 130_1, which has received the transmission request for the resource information, reads the resource information 421 from the resource information storage unit 202, and transmits the resource information 421 to the second service provision apparatus 150 as illustrated in FIG. 11B. The terminal device 130_1 also transmits the service ID to the second service provision apparatus 150 along with the transmission of the resource information 421.

The second service provision apparatus 150, which has received the resource information 421 from the terminal device 130_1, stores the received resource information in the resource management information storage unit 222 as the resource management information.

The second service provision apparatus 150, which has received the service ID from the terminal device 130_1, transmits the received service ID to the information storage server 160.

The information storage server 160, which has received the service ID from the second service provision apparatus 150, searches for resource management information which is stored in association with the received service ID. When corresponding resource management information is retrieved as a result of the search, the retrieved resource management information is transmitted to the second service provision apparatus 150 (FIG. 11C). Here, it is assumed that the resource management information 500 is retrieved and transmitted to the second service provision apparatus 150.

The second service provision apparatus 150, which has received the resource management information 500 from the information storage server 160, analyzes the received resource management information 500. Thus, the second service provision apparatus 150 is able to recognize the application distributed by the first service provision apparatus 110 when the terminal device 130_1 is provided with the service for learning by the first service provision apparatus 110.

The second service provision apparatus 150 also determines assignment of the applications distributed by the first service provision apparatus 110, based on the resource information received from the terminal device 130_1. In addition, the second service provision apparatus 150 updates the resource management information based on the determined assignment, and stores the updated resource management information in the resource management information storage unit 222.

The second service provision apparatus 150 regenerates the applications based on the updated resource management information 600, and distributes the regenerated applications to the terminal device 130_1. Specifically, the second service provision apparatus 150 regenerates the applications including the application for whiteboard, the application for learning, and the application for speaker, and distributes the applications to the terminal device 130_1 (FIG. 11C).

Consequently, the second service provision apparatus 150 is able to control the same applications as the applications distributed by the first service provision apparatus 110 and to provide the same service for learning as that provided by the first service provision apparatus 110.

Next, the more detailed functional configuration of the first service provision apparatus 110, the service execution apparatus 200, and the second service provision apparatus 150 will be described.

Figure 12:
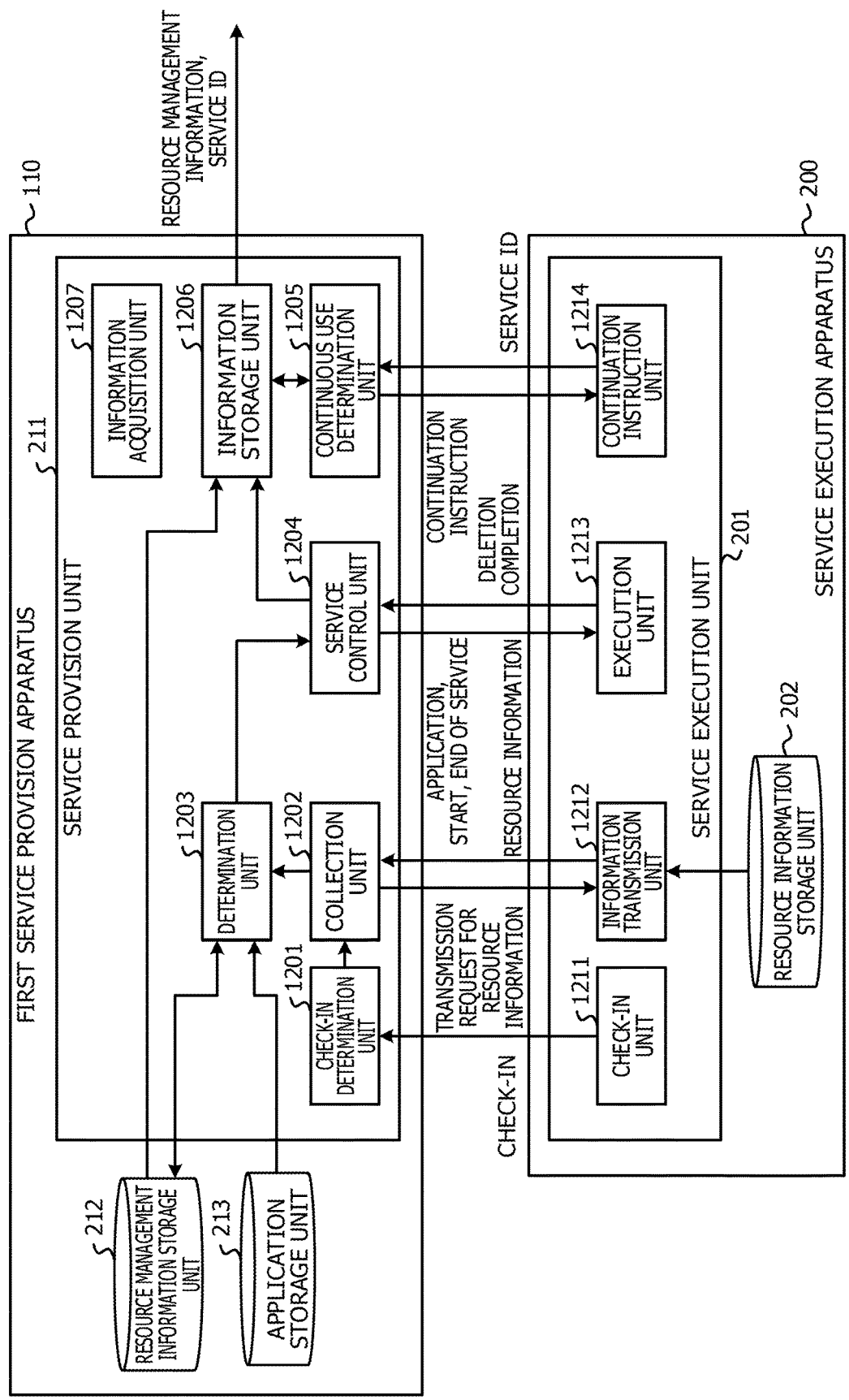
FIG. 12 illustrates an example detailed functional configuration of the first service provision apparatus and a service execution apparatus.

FIG. 12 illustrates an example detailed functional configuration of the first service provision apparatus and the service execution apparatus. As illustrated in FIG. 12, the service provision unit 211 has a check-in determination unit 1201, a collection unit 1202, a determination unit 1203, a service control unit 1204, a continuous use determination unit 1205, an information storage unit 1206, and an information acquisition unit 1207.

The check-in determination unit 1201 sends a check-in request and determines the presence of check-in based on a response from the service execution apparatus 200 located in a predetermined area. When check-in is determined to be present, the check-in determination unit 1201 notifies the collection unit 1202 of the presence.

Upon receiving a notification of the presence of check-in from the check-in determination unit 1201, the collection unit 1202 makes a transmission request for the resource information to the service execution apparatus 200. When the resource information is received from the service execution apparatus 200 in response to the transmission request for the resource information, the collection unit 1202 notifies the determination unit 1203 of the received resource information.

The determination unit 1203 stores the resource information on each service execution apparatus received by the collection unit 1202 in the resource management information storage unit 212 as the resource management information 500. In addition, the determination unit 1203 determines each usable application when the service for learning is provided, and determines a resource to be assigned with the application to be distributed, based on the resource information on each service execution apparatus received by the collection unit 1202. The determination unit 1203 updates the resource management information 500 by storing a result of the assignment in the resource management information. The determination unit 1203 also reads an application from the application storage unit 213 based on the updated resource management information 500, regenerates the application for each service execution apparatus which is a distribution destination, and notifies the service control unit 1204 of the application.

The service control unit 1204 distributes the application in the notification from the determination unit 1203 to each service execution apparatus. Also, the service control unit 1204 controls the execution of the application by each service execution apparatus, and starts to provide the service for learning. When the provision of the service for learning ends, the service control unit 1204 notifies each service execution apparatus of the end of the provision of the service for learning. In addition, when a deletion completion notification for the distributed applications is transmitted from the service execution apparatus 200 in response to the notification of end of the provision of the service for learning, the service control unit 1204 receives the deletion completion notification and notifies the information storage unit 1206 of the deletion completion notification.

When a continuation instruction is transmitted from the service execution apparatus 200 in response to the notification of end of the provision of the service for learning by the service control unit 1204, the continuous use determination unit 1205 receives the continuation instruction and notifies the information storage unit 1206 of the continuation instruction. When the service ID is received from the information storage unit 1206 in response to the notification of the continuation instruction to the information storage unit 1206, the continuous use determination unit 1205 transmits the service ID to the service execution apparatus 200.

When a deletion completion notification is received from the service control unit 1204 after the continuation instruction is received from the continuous use determination unit 1205, the information storage unit 1206 notifies the continuous use determination unit 1205 of the service ID for identifying the service for learning provided by the service control unit 1204. Also, the information storage unit 1206, when receiving a continuation instruction from the continuous use determination unit 1205, reads the resource management information 500 from the resource management information storage unit 212, and transmits the resource management information 500 in association with the service ID to the information storage server 160.

It is to be noted that the information acquisition unit 1207 is operated when the second service provision apparatus 150 provides the service for learning, and thus the information acquisition unit 1207 will be described later as a functional configuration of the second service provision apparatus 150.

On the other hand, as illustrated in FIG. 12, the service execution unit 201 of the service execution apparatus 200 has a check-in unit 1211, an information transmission unit 1212, an execution unit 1213, and a continuation instruction unit 1214.

In response to a check-in request sent by the check-in determination unit 1201, the check-in unit 1211 checks in to the service for learning provided by the service provision unit 211.

In response to the check-in of the check-in unit 1211, the information transmission unit 1212 receives a transmission request for the resource information, which is transmitted from the collection unit 1202. Also, the information transmission unit 1212 reads the resource information stored in the resource information storage unit 202, and transmits the resource information to the collection unit 1202.

The execution unit 1213 receives applications distributed from the service control unit 1204, and executes the received applications under the control of the service control unit 1204 to receive the service for learning. The execution unit 1213, when receiving a notification of end of the provision of the service for learning from the service control unit 1204, deletes the applications distributed from the service control unit 1204. In addition, upon completion of the deletion of the applications, the execution unit 1213 transmits a deletion completion notification to the service control unit 1204.

The continuation instruction unit 1214, when receiving a notification of end of the provision of the service for learning from the service control unit 1204, receives a continuation instruction if the continuation instruction is inputted by a user (for instance, the user 180_1). The continuation instruction unit 1214 also transmits the received continuation instruction to the continuous use determination unit 1205. In addition, after the transmission of the continuation instruction, when the service ID is transmitted from the continuous use determination unit 1205 due to transmission of a deletion completion notification from the execution unit 1213, the continuation instruction unit 1214 receives the service ID, and notifies the information transmission unit 1212 of the service ID.

Figure 13:
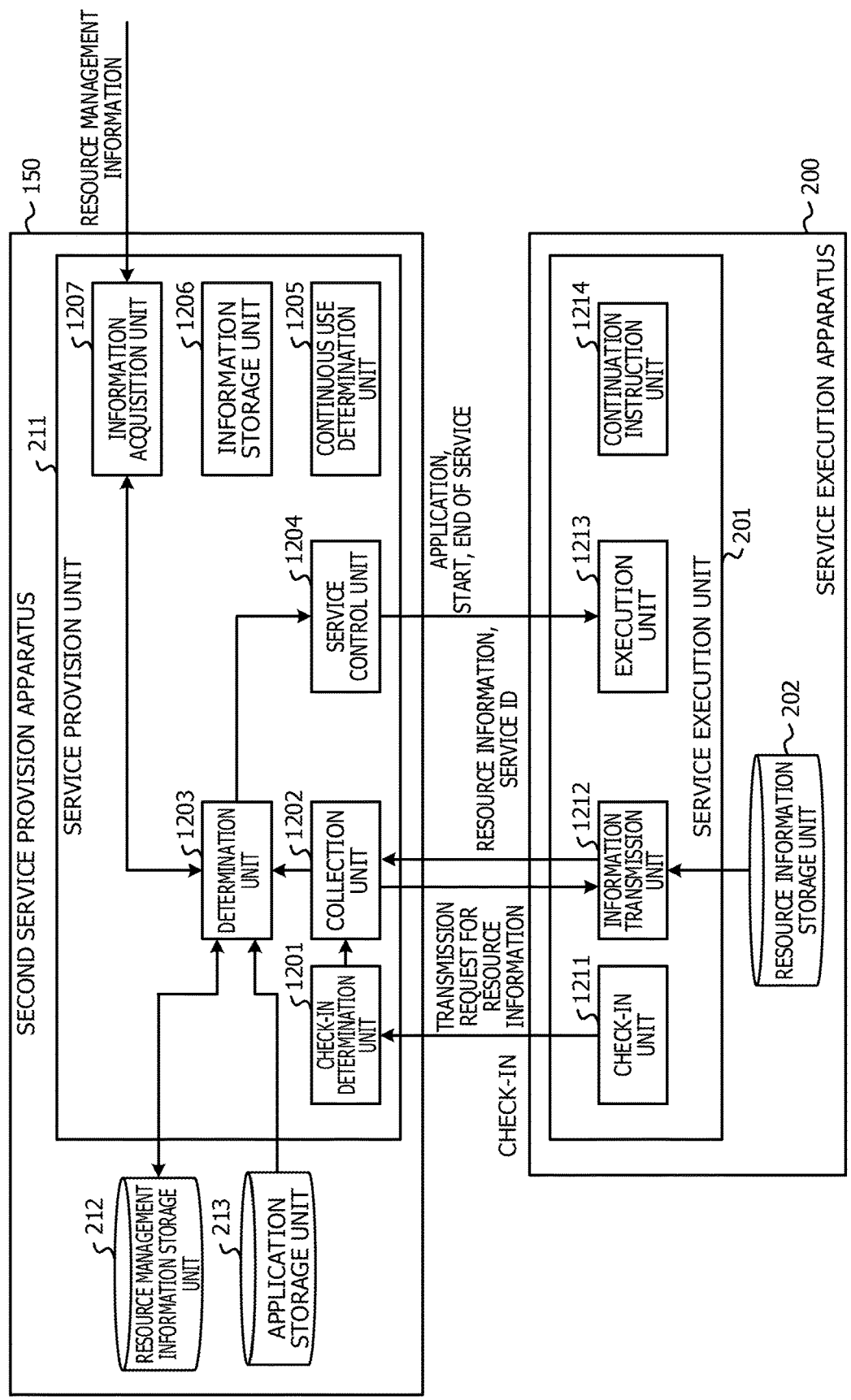
FIG. 13 illustrates an example detailed functional configuration of the second service provision apparatus and a service execution apparatus.

FIG. 13 illustrates an example detailed functional configuration of the second service provision apparatus and the service execution apparatus. It is to be noted that the functional configuration of the second service provision apparatus 150 illustrated in FIG. 13 is the same as the functional configuration of the first service provision apparatus 110 illustrated in FIG. 12, and the functional configuration of the service execution apparatus 200 illustrated in FIG. 13 is the same as the functional configuration of the service execution apparatus 200 illustrated in FIG. 12.

However, each unit illustrated in FIG. 13 performs a different operation from that performed by each unit illustrated in FIG. 12, and thus the point of difference between the operations will be mainly described below.

In the service provision unit 211, the collection unit 1202, when receiving resource information and a service ID from the service execution apparatus 200 in response to a transmission request for resource information, notifies the determination unit 1203 of the received resource information and service ID.

The determination unit 1203 stores the resource information in the notification from the collection unit 1202 in the resource management information storage unit 212 as resource management information 600. Also, the determination unit 1203 notifies the information acquisition unit 1207 of the service ID in the notification from the collection unit 1202, thereby obtaining the resource management information 500 from the information acquisition unit 1207. The determination unit 1203 analyzes the obtained resource management information 500, thereby recognizing the applications distributed when the service for learning is provided by the first service provision apparatus 110.

In addition, the determination unit 1203 assigns the recognized applications to each resource included in the resource information in the notification from the collection unit 1202. The determination unit 1203 updates the resource management information 600 by storing a result of the assignment in the resource management information storage unit 212. The determination unit 1203 also reads an application from the application storage unit 213 based on the updated resource management information 600, regenerates the application for each service execution apparatus which is a distribution destination, and notifies the service control unit 1204 of the application. Here, the determination unit 1203 regenerates the applications including the application for whiteboard, the application for learning, and the application for speaker, and notifies the service control unit 1204 of the regenerated applications. The service control unit 1204 distributes the applications in the notification from the determination unit 1203 to the terminal device 130_1.

In this manner, the determination unit 1203 of the first service provision apparatus 110 regenerates applications based on the resource information group (the resource management information 500) received by the collection unit 1202 of the first service provision apparatus 110. On the other hand, the determination unit 1203 of the second service provision apparatus 150 regenerates applications based on the resource information groups (the resource management information 500, 600) received by the collection units 1202 of the first and second service provision apparatuses 110, 150. That is, the determination unit 1203 of the second service provision apparatus 150 regenerates different applications from the applications regenerated by the determination unit 1203 of the first service provision apparatus 110.

As illustrated in FIG. 13, in the service execution unit 201 of the service execution apparatus 200, the information transmission unit 1212, when receiving a transmission request for the resource information from the collection unit 1202, transmits the resource information and the service ID to the collection unit 1202.

Figure 14:
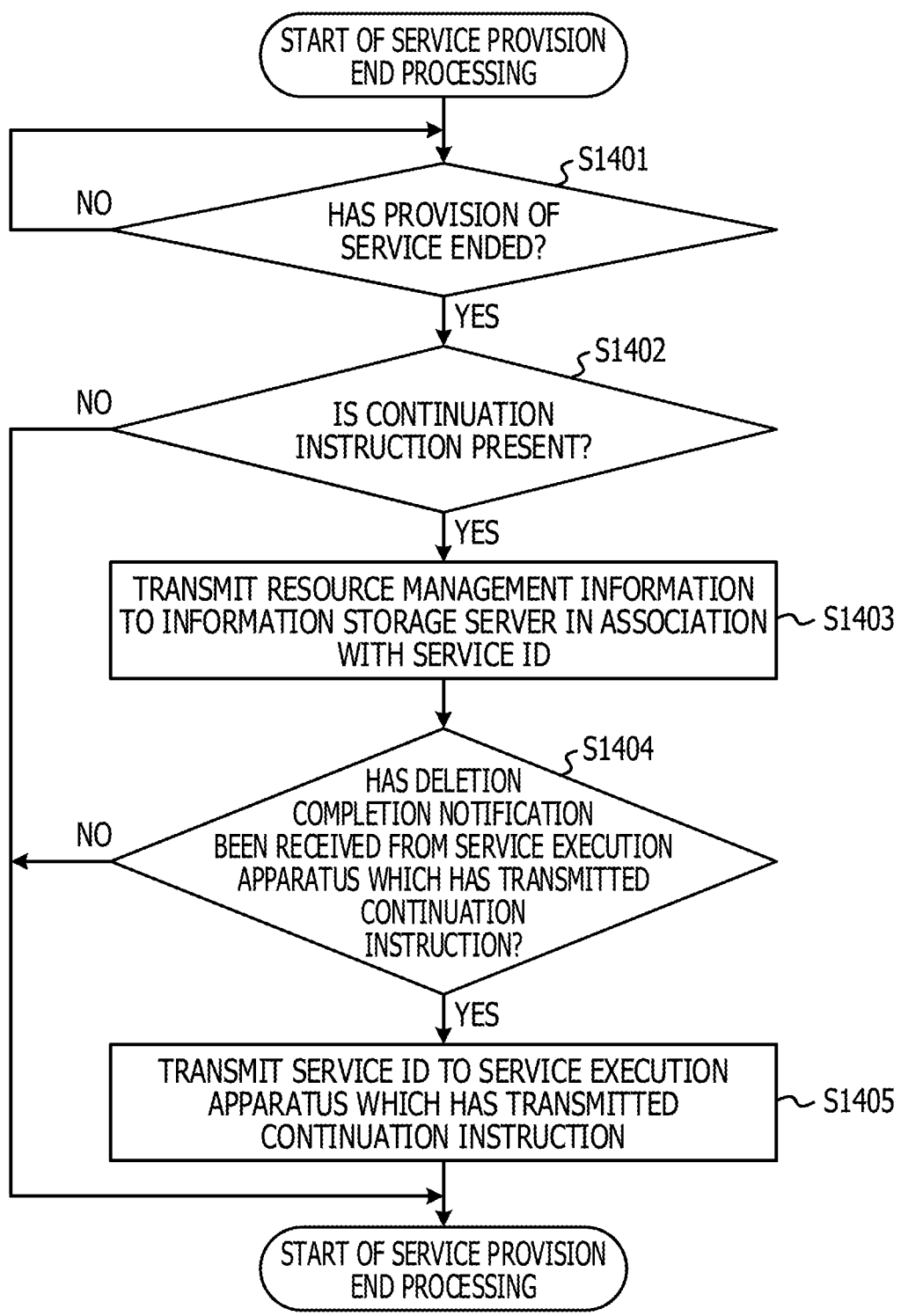
FIG. 14 is a flow chart of service provision end processing.

Next, the flow of service provision end processing performed by the first service provision apparatus 110 will be described. FIG. 14 is a flow chart of the service provision end processing. The flow chart illustrated in FIG. 14 starts when the service control unit 1204 starts to provide the service for learning.

In S1401, the service control unit 1204 determines whether or not provision of the service for learning has ended. In S1401, when it is determined that the provision of the service for learning has not ended, the flow stands by until the provision ends.

On the other hand, in S1401, when it is determined that the provision of the service for learning has ended, the flow proceeds to S1402. In S1402, the continuous use determination unit 1205 determines whether or not any of the service execution apparatuses 200, which have checked in to the service for learning provided by the first service provision apparatus 110, has transmitted a continuation instruction.

In S1402, when it is determined that no service execution apparatus 200 has transmitted a continuation instruction, the service provision end processing is terminated.

On the other hand, in S1402, when it is determined that a service execution apparatus 200 has transmitted a continuation instruction, the flow proceeds to S1403. In S1403, the information storage unit 1206 transmits the resource management information 500 stored in the resource management information storage unit 212 in association with the service ID to the information storage server 160.

In S1404, the service control unit 1204 determines whether or not a deletion completion notification for distributed applications has been received from the service execution apparatus 200 which has transmitted a continuation instruction.

In S1404, when it is determined that a deletion completion notification has not been received, the service provision end processing is terminated. On the other hand, in S1404, when it is determined that a deletion completion notification has been received, the flow proceeds to S1405.

In S1405, the continuous use determination unit 1205 transmits the service ID to the service execution apparatus 200 which has transmitted a continuation instruction.

Figure 15:
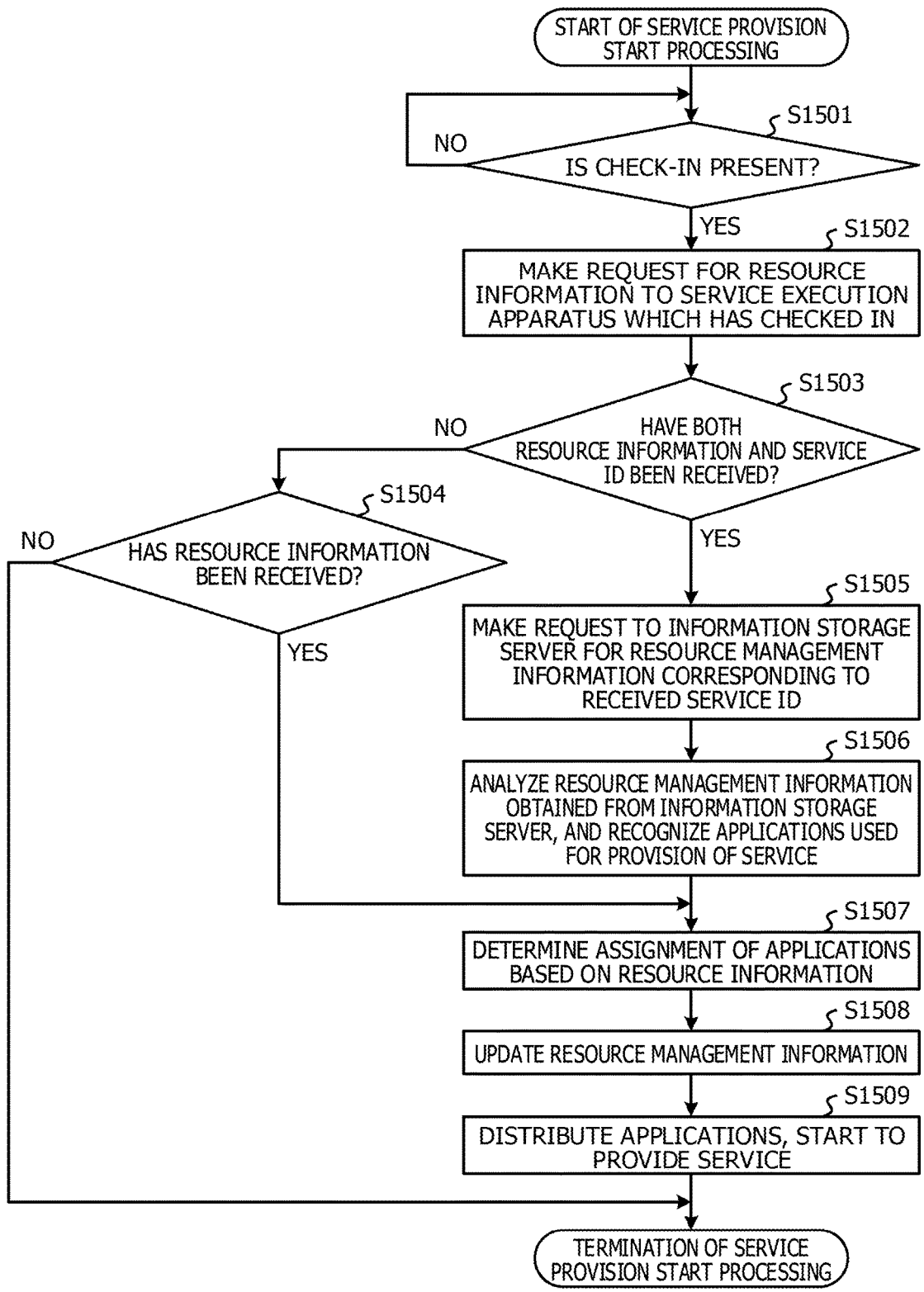
FIG. 15 is a flow chart of service provision start processing.

Next, the flow of service provision start processing performed by the second service provision apparatus 150 will be described. FIG. 15 is a flow chart of the service provision start processing.

In S1501, the check-in determination unit 1201 determines whether or not a service execution apparatus 200 has checked in. In S1501, when it is determined that no service execution apparatus 200 has checked in, the flow stands by until check-in occurs.

On the other hand, in S1501, when check-in is determined to be present, the flow proceeds to S1502. In S1502, the collection unit 1202 makes a transmission request for the resource information to a service execution apparatus 200 which has checked in.

In S1503, the collection unit 1202 determines whether or not both the resource information and the service ID have been received from the service execution apparatus 200 in response to the transmission request for the resource information. In S1503, when it is determined that one of the resource information and the service ID has not been received, the flow proceeds to S1504.

In S1504, the collection unit 1202 determines whether or not the resource information has been received. In S1504, when it is determined that the resource information has not been received, the service provision start processing is terminated. On the other hand, when it is determined that the resource information has been received, the flow proceeds to S1507.

On the other hand, in S1503, when it is determined that both the resource information and the service ID have been received, the flow proceeds to S1505. In S1505, the determination unit 1203 stores the received resource information in the resource management information storage unit 212 as the resource management information 600. Also, the information acquisition unit 1207 makes a request to the information storage server 160 for resource management information corresponding to the received service ID.

In S1506, the determination unit 1203 analyzes the resource management information 500 obtained from the information storage server 160, and recognizes the applications distributed when the service for learning is provided by the first service provision apparatus 110.

In S1507, the determination unit 1203 determines assignment of applications to be distributed, based on the resource information received in S1503.

Specifically, when the service ID has not been received in S1503, usable applications are determined and assignment of the applications to each resource is determined based on the resource information. When the service ID has been received in S1503, assignment of the applications recognized in S1506 to each resource is determined based on the resource information.

In S1508, the determination unit 1203 updates the resource management information 600 by storing a result of the assignment in the resource management information.

In S1509, the determination unit 1203 also reads an application from the application storage unit 213 based on the updated resource management information 600, regenerates the application for each service execution apparatus which is a distribution destination, and notifies the service control unit 1204 of the application. The service control unit 1204 distributes the application in the notification to each service execution apparatus which is a distribution destination, thereby starting provision of the service for learning.

As is obvious from the description above, in the learning system 100, the first service provision apparatus 110 obtains the resource information owned by the service execution apparatus 200 in a predetermined area. The first service provision apparatus 110 determines usable applications when the service for learning is provided, based on the obtained resource information, determines assignment of applications to each resource, and distributes the applications according to a result of the assignment.

In the learning system 100, when a continuation instruction is received from the service execution apparatus 200 after the provision of the service for learning ends, the first service provision apparatus 110 transmits the resource management information 500 along with the service ID to the information storage server 160. When a deletion completion notification for distributed applications is received from the service execution apparatus 200 which has sent a continuation instruction, the first service provision apparatus 110 transmits the service ID to the service execution apparatus 200 which has sent a continuation instruction.

Consequently, in a state in which check-in to the service for learning provided by the first service provision apparatus 110 is maintained, the service execution apparatus 200 is able to check in to the service for learning provided by the second service provision apparatus 150. The second service provision apparatus 150, to which the service execution apparatus 200 has checked in, is able to recognize the applications distributed when the service for learning is provided by the first service provision apparatus 110, based on the resource management information 500. In addition, the second service provision apparatus 150 is able to determine assignment using the same applications as the applications distributed when the service for learning is provided by the first service provision apparatus 110, and to provide the service for learning.

Consequently, with the learning system 100, it is possible to extend the area where a similar service for learning may be provided.

[Second Embodiment]

In the first embodiment described above, the resource information is obtained and assignment of applications to each resource is determined before the service provision unit 211 starts to provide the service for learning. On the other hand, in a second embodiment, service provision additional processing is described, in which when a new service execution apparatus checks in after the service provision unit 211 starts to provide the service for learning, assignment of applications to each resource is changed.

In the following, service provision additional processing will be described in the case where during provision of the service for learning by the first service provision apparatus, a service execution apparatus which has been provided with the service for learning by another service provision apparatus newly checks in.

Figure 16:
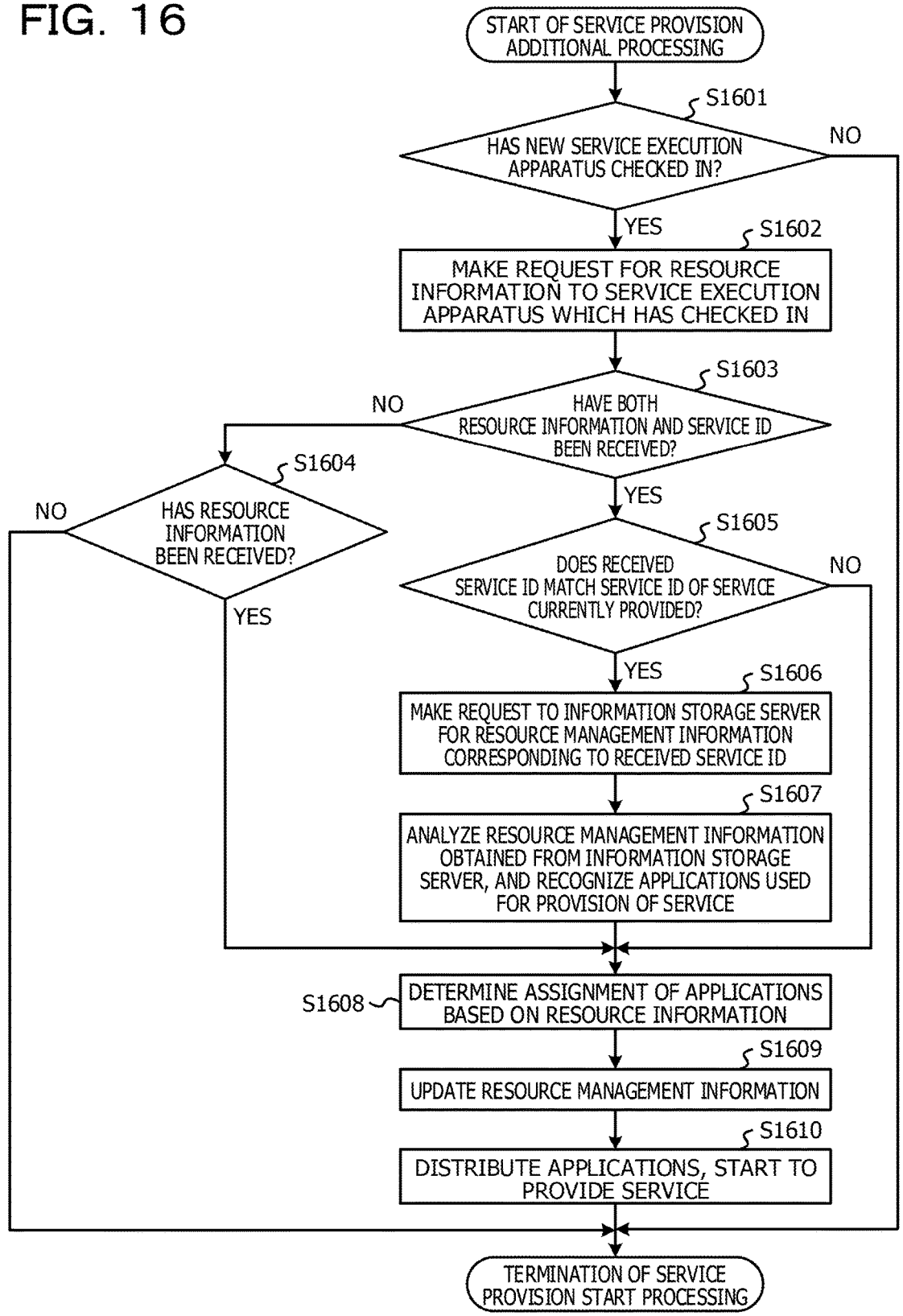
FIG. 16 is a flow chart of service provision additional processing.

FIG. 16 is a flow chart of the service provision additional processing. The flow chart illustrated in FIG. 16 is to be executed after the service provision unit 211 of the first service provision apparatus 110 starts to provide the service for learning.

In S1601, the check-in determination unit 1201 determines whether or not a new service execution apparatus has checked in. When a new service execution apparatus has not checked in, the service provision additional processing is terminated.

On the other hand, in S1601, when it is determined that a new service execution apparatus has checked in, the flow proceeds to S1602. In S1602, the collection unit 1202 makes a transmission request for the resource information to the newly checked-in service execution apparatus.

In S1603, the collection unit 1202 determines whether or not both the resource information and the service ID have been received from the new service execution apparatus in response to the transmission request for the resource information. In S1603, when it is determined that one of the resource information and the service ID has not been received, the flow proceeds to S1604.

In S1604, the collection unit 1202 determines whether or not the resource information has been received. In S1604, when it is determined that the resource information has not been received, the service provision additional processing is terminated. On the other hand, when it is determined that the resource information has been received, the flow proceeds to S1608.

On the other hand, in S1603, when it is determined that both the resource information and the service ID have been received, the flow proceeds to S1605. In S1605, the determination unit 1203 updates the resource management information 500 stored in the resource management information storage unit 212 based on the received resource information. Also, the determination unit 1203 determines whether or not the service ID received from the newly checked-in service execution apparatus matches the service ID of the service for learning currently provided.

In S1605, when it is determined that two service IDs match, the flow proceeds to S1606. In S1606, the information acquisition unit 1207 makes a request to the information storage server 160 for resource management information corresponding to the service ID.

In S1607, the determination unit 1203 analyzes the resource management information obtained from the information storage server 160, and recognizes the applications distributed when the new service execution apparatus is provided with the service for learning by another service provision apparatus.

In S1608, the determination unit 1203 determines assignment of applications to be distributed based on the resource management information 500 updated by the resource information received in S1603.

Specifically, when a service ID has not been received in S1603, the determination unit 1203 determines usable applications based on the resource included in the updated resource management information 500. Also, the determination unit 1203 determines assignment of usable applications to each resource included in the updated resource management information 500.

On the other hand, when a service ID has been received in S1603, the determination unit 1203 determines applications to be distributed based on the resource management information obtained from the information storage server 160 according to the service ID. Also, the determination unit 1203 determines assignment of applications to each resource included in the updated resource management information 500.

In S1609, the determination unit 1203 updates the resource management information 500 again by storing a result of the assignment in the resource management information.

In S1610, the determination unit 1203 also reads an application from the application storage unit 213 based on the again updated resource management information 500, regenerates the application for each service execution apparatus which is a distribution destination, and notifies the service control unit 1204 of the application. The service control unit 1204 distributes the application in the notification to each service execution apparatus which is a distribution destination, thereby starting provision of the service for learning.

As is obvious from the description above, in the learning system 100, when a new service execution apparatus checks in after the start of the provision of the service for learning, the resource management information is updated in consideration of the resources of the newly checked-in service execution apparatus.

When the newly checked-in service execution apparatus has a service ID, the resource management information obtained from the information storage server based on the service ID is analyzed. The applications distributed by another service provision apparatus when the newly checked-in service execution apparatus was provided with the service for learning by the another service provision apparatus are recognized. Furthermore, the resource management information is updated so that the applications are assigned.

In this manner, when the resources available to the service provision apparatus are changed, the resource management information is updated according to the change and applications are redistributed, thereby making it possible to maximize the utilization of available resources.

[Third Embodiment]

In the first embodiment described above, description has been given in which the execution unit 1213 in the service execution unit 201 included in the service execution apparatus 200 executes all applications distributed from the service provision apparatus. On the other hand, in a third embodiment, different execution units are provided according to the types of applications distributed from the service provision apparatus, and the execution units are operated according to the types of the applications.

FIG. 17 is a diagram illustrating a result of distribution of applications when the service for learning is provided by the first service provision apparatus in the third embodiment.

As illustrated in FIG. 17, the terminal device 130_1 has execution units 1701 to 1703. When an application for whiteboard is distributed from the first service provision apparatus 110, the execution unit 1701 of these units executes the application for whiteboard. When an application for learning is distributed from the first service provision apparatus 110, the execution unit 1702 executes the application for learning. In addition, when an application for speaker is distributed from the first service provision apparatus 110, the execution unit 1703 executes the application for speaker. In this manner, an execution unit is provided for each application, and thus the display unit 306 allows the application for whiteboard and the application for learning to be displayed in separate windows.

[Fourth Embodiment]

In the first embodiment described above, description has been given in which each service execution apparatus receives distribution of applications from the service provision apparatus. On the other hand, in a fourth embodiment, part of the service execution apparatuses obtains applications from another service execution apparatus which has received distribution of applications from the service provision apparatus.

Figure 18A:
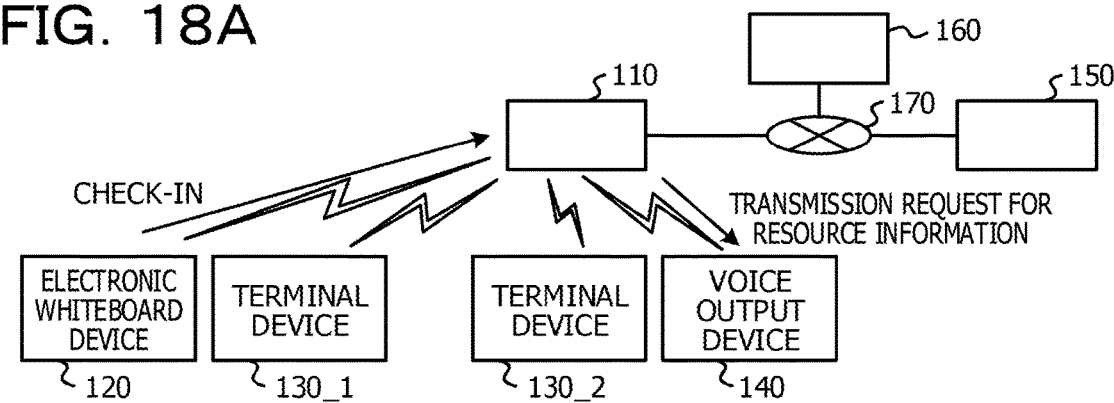
FIGS. 18A to 18C provide second diagrams for explaining the flow of processing up to the point when the first service provision apparatus provides the service for learning.
Figure 18B:
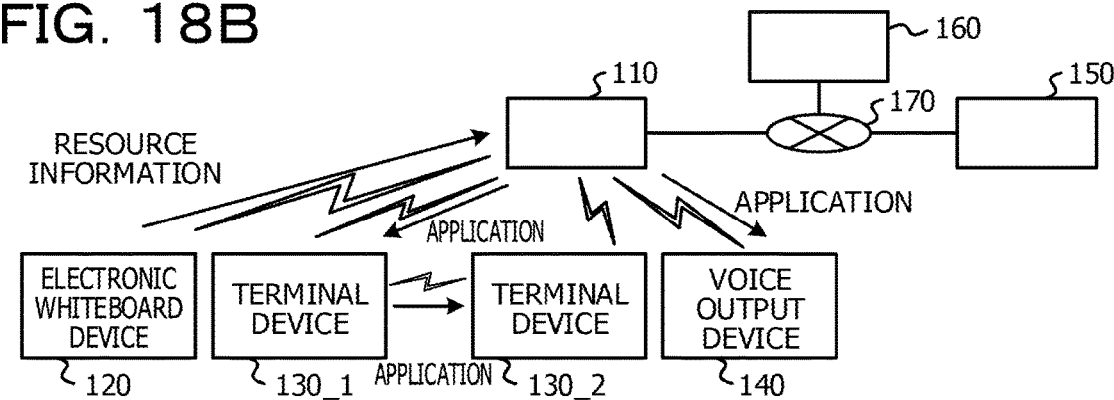
Figure 18C:
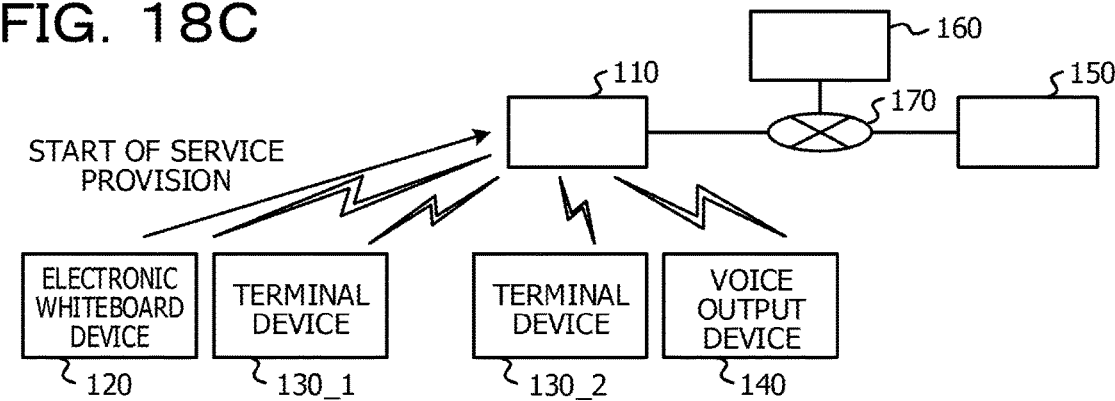

FIGS. 18A to 18C provide diagrams for explaining the flow of processing up to the point when the first service provision apparatus provides the service for learning, and the diagrams correspond to FIGS. 9A to 9C of the first embodiment. The point of difference from FIGS. 9A to 9C is that in FIG. 18B, the terminal device 130_2 obtains an application from the terminal device 130_1, the application being distributed to the terminal device 130_1. As illustrated in FIG. 18B, the terminal device 130_2 has the same resources as those of the terminal device 130_1, and thus the same applications are distributed. Therefore, it is possible to receive the same service as the service for learning received by the terminal device 130_1 by obtaining the applications distributed to the terminal device 130_1.

[Fifth Embodiment]

In the first embodiment described above, the case has been described where the user 180_1 provided with the service for learning by the first service provision apparatus 110 is continuously provided with the service for learning by the second service provision apparatus 150. That is, in the first embodiment, the case has been described where the user 180_1 carries the terminal device 130_1 and moves once. However, the number of movements of the user 180_1 carrying the terminal device 130_1 is not limited to one, and the user 180_1 may move multiple times. That is, the user may be allowed to continuously receive the service for learning at three or more locations.

In this case, when a service provision apparatus installed in any one of the locations receives a continuation instruction from the terminal device 130_1 after the provision of the service for learning ends, the service provision apparatus transmits the position information on the service provision apparatus in addition to the resource management information and the service ID, to the information storage server 160.

Thus, in the service provision apparatus to which the terminal device 130_1 has newly checked in, when pieces of resource management information is obtained from the information storage server 160 based on the service ID, the service provision apparatus may obtain the position information on the resource as well. Consequently, the user 180_1 is able to recognize the resources available to the service provision apparatus at each of the positions. Hereinafter, a fifth embodiment will be described.

Figure 19A:
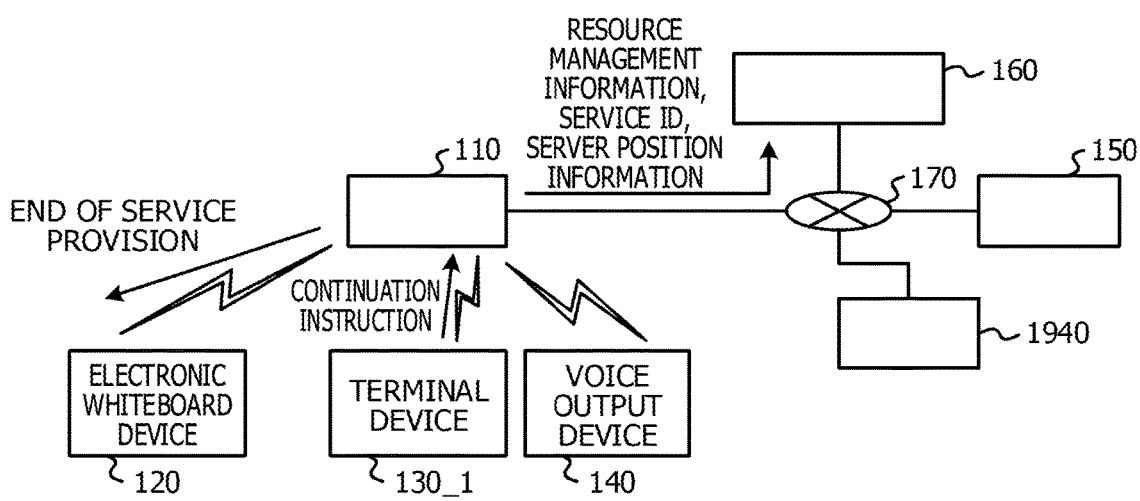
FIGS. 19A and 19B provide second diagrams for explaining the flow of processing until a terminal device is moved since the provision of the service for learning by the first service provision apparatus ends.
Figure 19B:
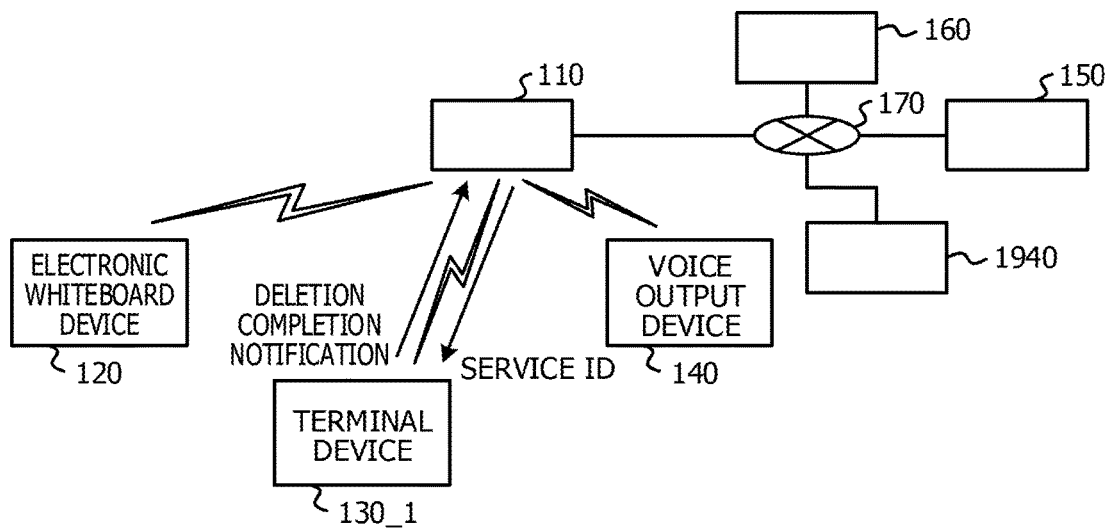

FIGS. 19A and 19B provide diagrams for explaining the flow of processing until a terminal device is moved since the provision of the service for learning by the first service provision apparatus ends, and the diagrams correspond to FIGS. 10A and 10B described in the first embodiment. A point of difference from FIGS. 10A and 10B is that in FIG. 19A, the first service provision apparatus 110 transmits position information. As illustrated in FIG. 19A, in the first service provision apparatus 110, when a continuation instruction is received from the terminal device 130_1, the position information on the first service provision apparatus 110 in addition to the resource management information 500 and the service ID is transmitted to the information storage server 160.

Another point of difference from FIGS. 10A and 10B is that after the terminal device 130_1 is provided with the service for learning by a third service provision apparatus 1940, the terminal device 130_1 is provided with the service for learning by the second service provision apparatus 150.

Figure 20A:
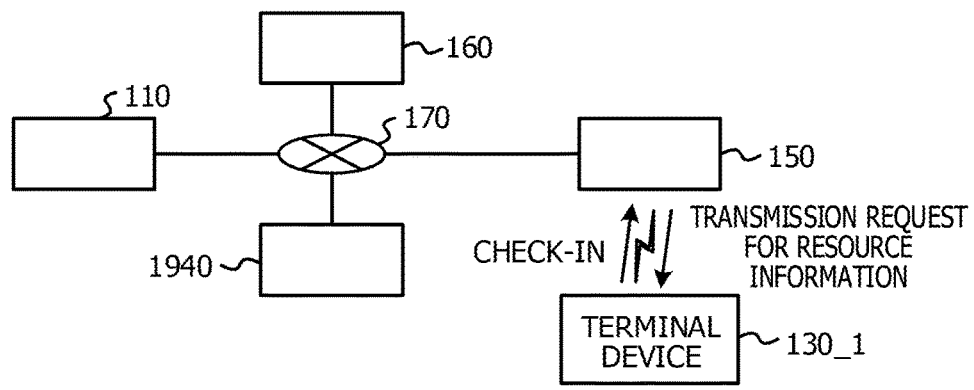
FIGS. 20A to 20C provide second diagrams for explaining the flow of processing up to the point when the second service provision apparatus provides the service for learning.
Figure 20B:
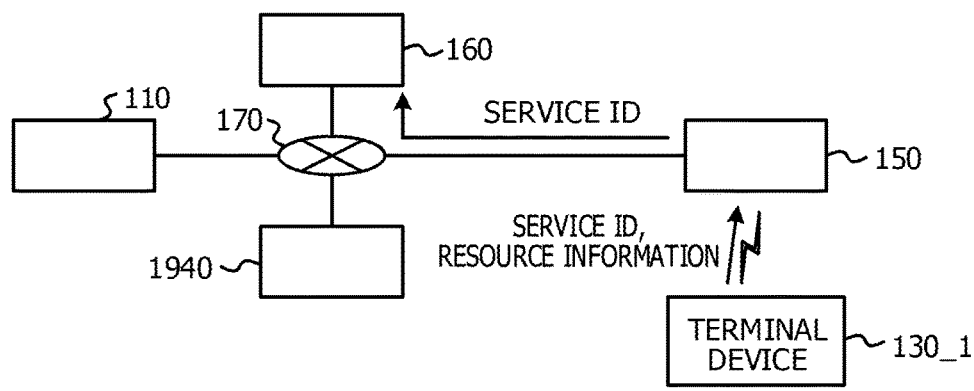
Figure 20C:
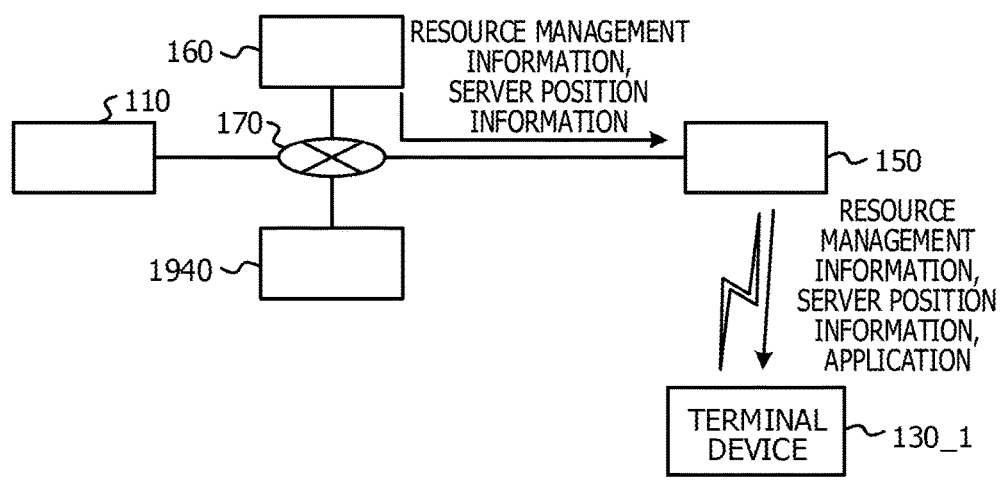

FIGS. 20A to 20C provide diagrams for explaining the flow of processing up to the point when the second service provision apparatus provides the service for learning, and the diagrams correspond to FIGS. 11A to 11C described in the first embodiment. A point of difference from FIGS. 11A to 11C is that in FIG. 20C, the information storage server 160 transmits the resource management information and the position information to the second service provision apparatus 150. Another point of difference is that the second service provision apparatus 150 distributes the resource management information and the position information in addition to the applications to the terminal device 130_1.

In this manner, the second service provision apparatus 150 distributes the resource management information and the position information to the terminal device 130_1, thereby allowing the user 180_1 of the terminal device 130_1 to recognize the resources available to another service provision apparatus and the position of the another service provision apparatus. It is to be noted that another service provision apparatus refers to the first and third service provision apparatuses.

That is, even when the resources available to the second service provision apparatus 150 are limited, the resources available to another service provision apparatus and its position are recognizable to the user 180_1. Consequently, the user 180_1 may grasp the location where desired resources are available.

[Other Embodiments]

Although the resource management information 500 is stored in the information storage server 160 in the embodiments described above, distributed applications in addition to the resource management information 500 may be stored. This allows the second service provision apparatus 150 to directly obtain the applications distributed by the first service provision apparatus 150, from the information storage server 160.

In the embodiments described above, the case has been described where each service execution apparatus has a display function or a voice output function as the output function. Each service execution apparatus, however, may have a print function as the output function.

In the embodiments described above, the case has been described where the number of service execution apparatuses connectable to the second service provision apparatus is less than the number of service execution apparatuses connectable to the first service provision apparatus. However, the case is similarly applicable where the number of service execution apparatuses connectable to the second service provision apparatus is greater than the number of service execution apparatuses connectable to the first service provision apparatus.

In the embodiments described above, description has been given in which when the position of the service execution apparatus 200 is in a predetermined area, the service for learning may be provided, and when the position is out of a predetermined area, the service for learning may not be provided. However, making determination as to whether or not the service for learning may be provided based on the position of the service execution apparatus 200 is only an example. In other words, whether or not the service for learning is provided may be determined based on whether or not the state of the service execution apparatus 200 other than its position is in a predetermined state.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A service provision method executed by a computing system configured to provide a service, the service provision method comprising:
    obtaining resource information indicating whether an external device to be used for providing the service is present in a first place in which a terminal is located at a first timing when the terminal utilizes the service;
    detecting whether another external device to be used for providing the service is present in a second place in which the terminal is located at a second timing;
    comparing the resource information with a result of the detecting;
    determining a specific application for providing the service in accordance with a result of the comparing the resource information; and
    providing the determined specific application for the terminal.

2. The service provision method according to claim 1, wherein
    the determining includes, when the result of the comparing indicates that the other external terminal having same function as the terminal present in the first place is not present in the second place, determining the specific application different from an application which is provided for the terminal at the first timing.

3. The service provision method according to claim 1, further comprising:
    storing, in a memory, relationship information associating an identifier of the terminal with an application which is provided for the terminal at the first timing,
    wherein
    the detecting includes receiving the identifier from the terminal, and
    the determining includes
        identifying the application associated with the identifier by referring to the relationship information in the memory in accordance with the received identifier;
        determining the specific application in accordance with the result of the comparing and the identified application.

4. The service provision method according to claim 3, wherein
    the computing system includes a first server and a second server,
    the storing is executed by the first server,
    the detecting, the comparing, and the determining are executed by the second server.

5. The service provision method according to claim 3, further comprising:
    deleting the application in the terminal when the terminal leaves the first place.

6. A system comprising:
    a first server configured to
        provide the determined specific application for the terminal, and
        store, in a memory, relationship information including an identifier of the terminal, the specific application, and the resource information of an environment in which the terminal is located at a first timing when the terminal utilizes the service; and
    a second server configured to
        obtain the identifier and another resource information of another environment in which the terminal is located at a second timing when the terminal utilizes the service, receive the relationship information from the first server in accordance with the obtained identifier,
compare the resource information with the other resource information,
determine another specific application for the service in accordance with both a result of the comparing and the specific application, and
provide the other specific application for the terminal
a terminal configured to use a service; and
a service provision apparatus configured to provide the service, wherein the service provision apparatus executes
collecting resource information of an output device coupled to the service provision apparatus when the terminal checks in to the service provision apparatus,
providing a first application to the terminal and a second application to the output device from the service provision apparatus when the output device is usable in accordance with the resource information, and
providing a third application to the terminal from the service provision apparatus, the third application generated on the basis of the first application and the second application, when the output device is unusable in accordance with the resource information.

7. An apparatus comprising:
a memory; and
a processor coupled to the memory and configured to:
obtain resource information indicating whether an external device to be used for providing the service is present in a first place in which a terminal is located at a first timing when a terminal utilizes the service provision apparatus;
detect whether another external device to be used for providing the service is present in a second place in which the terminal is located at a second timing;
compare the resource information with a result of the detecting;
determining a specific application for providing the service in accordance with a result of the comparing the resource information; and
provide the determined specific application for the terminal.

* * * * *